(12) United States Patent
Kumagai et al.

(10) Patent No.: US 11,850,665 B2
(45) Date of Patent: Dec. 26, 2023

(54) NICKEL POWDER AND METHOD FOR PRODUCING NICKEL POWDER

(71) Applicant: SUMITOMO METAL MINING CO., LTD., Tokyo (JP)

(72) Inventors: Yuki Kumagai, Niihama (JP); Atsushi Igari, Niihama (JP); Minseob Shin, Niihama (JP); Shingo Suto, Niihama (JP); Masaya Yukinobu, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 54 days.

(21) Appl. No.: 17/630,330

(22) PCT Filed: Jul. 30, 2020

(86) PCT No.: PCT/JP2020/029288
§ 371 (c)(1),
(2) Date: Jan. 26, 2022

(87) PCT Pub. No.: WO2021/020522
PCT Pub. Date: Feb. 4, 2021

(65) Prior Publication Data
US 2022/0250144 A1    Aug. 11, 2022

(30) Foreign Application Priority Data
Jul. 31, 2019   (JP) .................................. 2019-140933

(51) Int. Cl.
*B22F 9/04*    (2006.01)
*B22F 9/24*    (2006.01)
(Continued)

(52) U.S. Cl.
CPC .................. *B22F 9/24* (2013.01); *B22F 1/00* (2013.01); *B22F 1/054* (2022.01); *B22F 1/056* (2022.01);
(Continued)

(58) Field of Classification Search
None
See application file for complete search history.

(56) References Cited

U.S. PATENT DOCUMENTS 6,040,087 A * 3/2000 Kawakami ................ B22F 1/08
429/223
6,379,419 B1   4/2002 Celik et al.
(Continued)

FOREIGN PATENT DOCUMENTS

JP   H04-365806 A   12/1992
JP   2000109323 A *  4/2000
(Continued)

OTHER PUBLICATIONS

English translation of JP 2000109323 (originally published Apr. 18, 2000) obtained from PE2E search.*
(Continued)

*Primary Examiner* — George Wyszomierski
(74) *Attorney, Agent, or Firm* — Locke Lord LLP; James E. Armstrong, IV; Nicholas J. DiCeglie, Jr.

(57) ABSTRACT

Provided is a nickel powder in which growth of the nickel hydroxide component into a plate-shaped crystal is suppressed in the oxide film, and the content of coarse particles containing plate-shaped nickel hydroxide is small, and provided is a method for manufacturing the nickel powder by a wet process in which the nickel powder can be produced further simply and easily. A nickel powder including: particles having a substantially spherical shape and a number average size of 0.03 μm to 0.4 μm; and an oxide film, on the particle surface, containing a basic salt of nickel hydroxide, wherein the content of coarse particles having a particle size of more than 0.8 μm is 200 mass ppm or less, and the content of coarse particles having a particle size of more than 1.2 μm is 100 mass ppm or less.

9 Claims, 5 Drawing Sheets

(51) Int. Cl.
    *B22F 1/16*     (2022.01)
    *B22F 1/065*     (2022.01)
    *B22F 1/145*     (2022.01)
    *B22F 1/054*     (2022.01)
    *B22F 1/00*     (2022.01)
    *B22F 1/12*     (2022.01)
    *B32B 5/16*     (2006.01)

(52) U.S. Cl.
    CPC .............. *B22F 1/065* (2022.01); *B22F 1/12* (2022.01); *B22F 1/145* (2022.01); *B22F 1/16* (2022.01); *B22F 9/04* (2013.01); *B32B 5/16* (2013.01); *B22F 2301/15* (2013.01); *B22F 2304/10* (2013.01)

(56) References Cited

U.S. PATENT DOCUMENTS

2002/0011131 A1    1/2002  Hosokura et al.
2018/0304375 A1   10/2018  Ishii et al.

FOREIGN PATENT DOCUMENTS

| JP | 2002-53904 A | 2/2002 |
| JP | 2002-530521 A | 9/2002 |
| WO | 2017/069067 A1 | 4/2017 |
| WO | WO-2017122689 A1 * | 7/2017 |

OTHER PUBLICATIONS

English translation of WO 2017122689 (originally published Jul. 20, 2017) obtained from PE2E search.*

* cited by examiner

NICKEL POWDER AND METHOD FOR PRODUCING NICKEL POWDER

TECHNICAL FIELD

The present invention relates to a high-performance nickel powder used as an electrode material in multilayer ceramic components and to a method for manufacturing the nickel powder. The present invention relates to a nickel powder manufactured from a water-containing nickel powder cake, as an intermediate, containing at least a nickel powder and water and to a method for manufacturing the nickel powder, and particularly relates to an inexpensive and high-performance nickel powder obtained by a wet process and to a method for manufacturing the nickel powder.

BACKGROUND ART

A nickel powder is used as a material for capacitors in electronic circuits, and in particular, as a material for thick film conductors that constitute, for example, internal electrodes of multilayer ceramic components such as multilayer ceramic capacitors (MLCCs) and multilayer ceramic substrates.

Multilayer ceramic capacitors have been recently improved to have a larger capacity, and the amount of internal electrode pastes used in forming internal electrodes of multilayer ceramic capacitors has also been increased significantly. Therefore, as a metal powder for internal electrode pastes constituting thick film conductors, inexpensive base metals such as nickel are mainly used instead of expensive noble metals.

In the process of manufacturing a multilayer ceramic capacitor, an internal electrode paste made by kneading a nickel powder, a binder resin such as an ethyl cellulose, and an organic solvent such as terpineol is screen-printed on a dielectric green sheet. Then, the dielectric green sheet on which the internal electrode paste is printed is dried, and the obtained dielectric green sheets are stacked so that the internal electrode paste printing layers and the dielectric green sheets are alternately layered, and further pressure-bonded to obtain a laminate.

This laminate is cut into a predetermined size, then the binder resin is removed with heat treatment (binder removing treatment), and the laminate after the binder removing treatment is fired at a high temperature of about 1,300° C. to obtain a ceramic molded body.

Then, an external electrode is attached to the obtained ceramic molded body to obtain a multilayer ceramic capacitor. A base metal such as nickel is used as the metal powder in the internal electrode paste that serves as the internal electrode, and therefore the binder removing treatment of the laminate is performed in an atmosphere having an extremely low oxygen concentration such as an inert atmosphere so that the base metal does not oxidize.

As multilayer ceramic capacitors have been improved to have a smaller size and a larger capacity, thinning of internal electrodes and dielectrics have been advanced. Consequently, a nickel powder used in the internal electrode pastes has become fine particles having a small particle size, and a nickel powder having an average particle size of 0.4 μm or less is required. In particular, a nickel powder having an average particle size of 0.3 μm or less is mainly used.

Methods for manufacturing a nickel powder are roughly classified into a vapor phase process and a wet process. Examples of the vapor phase process include a method described in Patent Literature 1 in which a nickel chloride vapor is reduced with hydrogen to produce a nickel powder, and a method described in Patent Literature 2 in which a nickel metal is vaporized in plasma to produce a nickel powder. Examples of the wet process include a method described in Patent Literature 3 in which a reducing agent is added to a nickel salt solution to produce a nickel powder.

The vapor phase process includes a high-temperature process performed at 1,000° C. or higher, and therefore the vapor phase process is an effective way to obtain a nickel powder having excellent crystallinity and a high characteristic, but there is a problem that the obtained nickel powder has wide particle size distribution. As described above, in thinning an internal electrode, a nickel powder is required that contains no coarse particle, has relatively narrow particle distribution, and has an average particle size of 0.4 μm or less. Therefore, in order to obtain such a nickel powder by the vapor phase process, an expensive classification device is to be introduced and classification treatment of a nickel powder is to be performed.

In the classification treatment, coarse particles can be removed that have a particle size larger than a value of about 0.6 μm to 2 μm as the classification point value, but some particles having a particle size smaller than the classification point value are also removed at the same time, and thus, there is also a problem that the actual product yield is significantly reduced. Therefore, in the vapor phase process, increase in the product cost including the cost of introducing the above-described expensive device is unavoidable.

Furthermore, in the vapor phase process in the case of using a nickel powder having an average particle size of 0.2 μm or less and particularly 0.1 μm or less, removing of coarse particles by classification treatment itself is difficult, and therefore further thinning of internal electrodes in the future cannot be achieved.

Meanwhile, the wet process has an advantage that the obtained nickel powder has narrower particle size distribution than in the vapor phase process. In the method described in Patent Literature 3, a nickel powder is produced by crystallization in which a reductive reaction is carried out in a reaction liquid obtained by adding a solution containing hydrazine as a reducing agent to a solution containing a copper salt as a nickel salt. It is known that in particular in the above-described method, the nickel salt (to be exact, nickel ion ($Ni^{2+}$) or nickel complex ion) is reduced by hydrazine in the coexistence with the metal salt (nucleating agent) that is nobler than nickel, so that the nucleation number is controlled (that is, the particle size is controlled), and the nucleation and the particle growth become uniform, and as a result, a fine nickel powder having further narrow particle size distribution (hereinafter, the nickel powder generated in the reaction liquid is sometimes referred to as nickel crystal powder) is obtained. For reference, FIG. 1 shows a typical process of manufacturing a nickel powder by the wet process.

In the case of applying the nickel powder obtained by the wet process to a multilayer ceramic capacitor, a nickel paste dry film containing the nickel powder and a resin as main components (a dry film obtained by printing and drying the nickel paste) is to have high flatness in order to prevent a short circuit between the electrodes in the above-described laminate including the internal electrode layer and the dielectric layer. In particular in order to cope with thinning of internal electrode layers (to a thickness of about 0.5 μm to 1.0 μm) due to the recent increase in the capacity of multilayer ceramic capacitors, a fine nickel powder having an average particle size of 0.3 μm or less and preferably 0.2 μm or less is used, and coarse particles having a size (for example, of 0.8 µm to 1.2 µm) about the same as the thickness of the internal electrode layer contained in the nickel powder is to be reduced to the utmost limit.

Therefore, Patent Literature 4 describes, as a method for manufacturing a nickel powder using the wet process, a method of obtaining a high-performance nickel powder containing coarse particles at an extremely small content at low cost. The method includes a crystallization step of performing a reductive reaction in a reaction liquid to enhance the reducing power of hydrazine. In the crystallization step, a trace amount of a specific amine compound or sulfide compound is added to the reaction liquid to suppress the self-decomposition reaction of hydrazine significantly and to hinder formation of coarse particles generated by connection between nickel particles.

CITATION LIST

Patent Literature

Patent Literature 1: JP 4-365806 A
Patent Literature 2: JP 2002-530521 A
Patent Literature 3: JP 2002-53904 A
Patent Literature 4: WO 2017/069067

SUMMARY OF INVENTION

Technical Problem

In the method for manufacturing a nickel powder using a wet process as described above, hydrazine is often used as a reducing agent. Therefore, as is clear from Patent Literature 4 and the like and as shown in FIG. 1 described above, in the crystallization step, a nickel powder slurry is obtained in which a nickel crystal powder is generated in a reaction liquid through a reductive reaction of hydrazine, and a washing and filtering step and a drying step follow the crystallization step. In the washing and filtering step, the nickel crystal powder is filtered out and collected from the nickel powder slurry while washed with pure water to obtain a washed water-containing nickel powder cake, and in the drying step, the washed water-containing nickel powder cake is heated and dried (for example, vacuum-dried) to obtain a nickel crystal powder (nickel powder).

The washing and filtering step is usually carried out in the air, and therefore oxidation of the nickel crystal powder is unavoidable because the resulting washed water-containing nickel powder cake is more or less exposed to the air during the washing and filtering step and before the drying in the drying step. In particular in a case where the crystallization reaction is carried out on a mass production scale, it takes time to handle the water-containing nickel powder cake unlike in the case of handling a small amount of cake at the laboratory level, and therefore the oxidation of the nickel crystal powder due to exposure to the air is likely to proceed.

In a case where the oxidation of the nickel crystal powder occurs in the washed water-containing nickel powder cake obtained from the nickel powder slurry through the washing and filtering step, there has been a problem that a coarse particle 10 (see FIG. 2) is likely to be generated that contains, as a main component, plate-shaped nickel hydroxide ($Ni(OH)_2$) in which particles of a nickel crystal powder 1 (having a particle size of 0.4 µm or less) are firmly connected to each other via nickel hydroxide 2. In the coarse particle 10, nickel hydroxide 2 is generated by that an oxide film containing the nickel hydroxide, as a main component, formed by the surface oxidation of the nickel crystal powder 1, easily grows into a plate-shaped crystal to form a firm plate-shaped nickel hydroxide matrix. In many cases, the coarse particle 10 containing the plate-shaped nickel hydroxide as a main component has a particle size of 0.8 µm or more, and may cause a malfunction in a multilayer ceramic capacitor or the like. Therefore, effective measures to suppress generation of the coarse particle 10 have been awaited.

Therefore, an object of the present invention is to provide a nickel powder in which generation of a coarse particle containing, as a main component, plate-shaped nickel hydroxide due to an oxide film of the nickel powder is suppressed even in a case where the nickel powder is manufactured from a water-containing nickel powder cake as an intermediate containing at least the nickel powder and water, a method for manufacturing the nickel powder and a method of forming an oxide film of the nickel powder, and particularly a method for manufacturing the nickel powder by a wet process in which the nickel powder can be produced further simply and easily.

Solution to Problem

The present inventors have found that in a method for manufacturing a nickel powder by a wet process, used for multilayer ceramic capacitors and the like, in a washing and filtering step in which a nickel crystal powder (nickel powder) is washed and filtered out from a nickel powder slurry (a slurry containing a nickel crystal powder without an oxide film) as a post-reaction liquid of crystallization and is collected as a water-containing nickel powder cake, generation of coarse particles containing the plate-shaped nickel hydroxide as a main component can be effectively suppressed with the following procedure. In the procedure, the nickel powder slurry is made to contain one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$), and then an oxide film containing, as a main component, a nickel hydroxide basic salt containing one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) is formed on the surface of the nickel crystal powder (nickel powder) without an oxide film. The present invention has been completed on the basis of such findings.

In order to solve the above-described problem, the nickel powder of the present invention includes particles having a substantially spherical shape and having a number average particle size of 0.03 µm to 0.4 µm and includes an oxide film containing, as a main component, a basic salt of nickel hydroxide on a surface of the nickel powder, and in the nickel powder, the content of coarse particles having a particle size of more than 0.8 µm and containing plate-shaped nickel hydroxide as a main component is 200 mass ppm or less, and the content of coarse particles having a particle size of more than 1.2 µm and containing plate-shaped nickel hydroxide as a main component is 100 mass ppm or less.

The basic salt of nickel hydroxide may include one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$).

The nickel powder may have an oxygen content of 0.35 mass %·$g/m^2$ or more with respect to the specific surface area of the nickel powder, and a sulfur content of 0.04 mass %·g/m² or less with respect to the specific surface area of the nickel powder.

In order to solve the above-described problem, the method for manufacturing a nickel powder of the present invention is a method for manufacturing the above-described nickel powder of the present invention, and includes an oxide film forming step of mixing a mixture of a nickel powder slurry in which a nickel powder without an oxide film is dispersed and one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) and hydrogen peroxide ($H_2O_2$) to form the oxide film containing, as a main component, a basic salt of one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) and nickel hydroxide on the surface of the nickel powder, a washing and filtering step of washing and filtering out the nickel powder including the oxide film formed on the surface to obtain a water-containing nickel powder cake of the nickel powder, and a drying step of heating and drying the water-containing nickel powder cake to obtain the nickel powder.

The method for manufacturing the nickel powder of the present invention may include a crystallization step of forming a nickel powder slurry, by crystallization using a reductive reaction in a reaction liquid containing at least a water-soluble nickel salt, a salt of a metal nobler than nickel, a reducing agent, and an alkali hydroxide, in which the nickel powder without an oxide film is dispersed.

The water-soluble nickel salt may be one or more selected from nickel chloride ($NiCl_2$), nickel sulfate ($NiSO_4$), and nickel nitrate ($Ni(NO_3)_2$).

The salt of a metal nobler than nickel may be one or more selected from a copper salt, a gold salt, a silver salt, a platinum salt, a palladium salt, a rhodium salt, and an iridium salt.

The alkali hydroxide may be one or more selected from sodium hydroxide (NaOH) and potassium hydroxide (KOH).

A sulfur coating treatment step may be included that is a step of subjecting the nickel powder slurry obtained in the crystallization step to sulfur coating treatment as surface treatment in which sulfur is adhered to the surface of the nickel powder without an oxide film, and the sulfur coating treatment step may be performed between the crystallization step and the oxide film forming step.

Advantageous Effects of Invention

The nickel powder according to the present invention has an extremely small content of coarse particles containing plate-shaped nickel hydroxide as a main component even if the nickel powder is obtained by heating and drying a water-containing nickel powder cake because in the oxide film of the nickel powder, growth of the nickel hydroxide component into a plate-shaped crystal is suppressed to suppress generation of the coarse particles effectively, and high flatness in the nickel paste dry film can be realized. Therefore, the nickel powder is suitable for applications such as internal electrodes of multilayer ceramic capacitors.

The method for manufacturing the nickel powder according to the present invention is, for example, a manufacturing method in which a water-containing nickel powder cake is used as an intermediate. In the case of a method for manufacturing the nickel powder by a wet process, the oxide film forming step is included in which hydrogen peroxide ($H_2O_2$) as an oxidizing agent is added to a nickel powder slurry as a post-reaction liquid, obtained in the crystallization step as one step of the method, containing a nickel crystal powder (nickel powder) without an oxide film to form an oxide film on the surface of the nickel crystal powder (nickel powder) without an oxide film, and in the oxide film forming step, an oxide film containing, as a main component, a nickel hydroxide basic salt containing one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) is formed, and thus generation of coarse particles containing plate-shaped nickel hydroxide as a main component can be effectively suppressed. Therefore, a high-performance nickel powder suitable for applications such as internal electrodes of multilayer ceramic capacitors can be manufactured at low cost.

DESCRIPTION OF EMBODIMENTS

Figure 1:
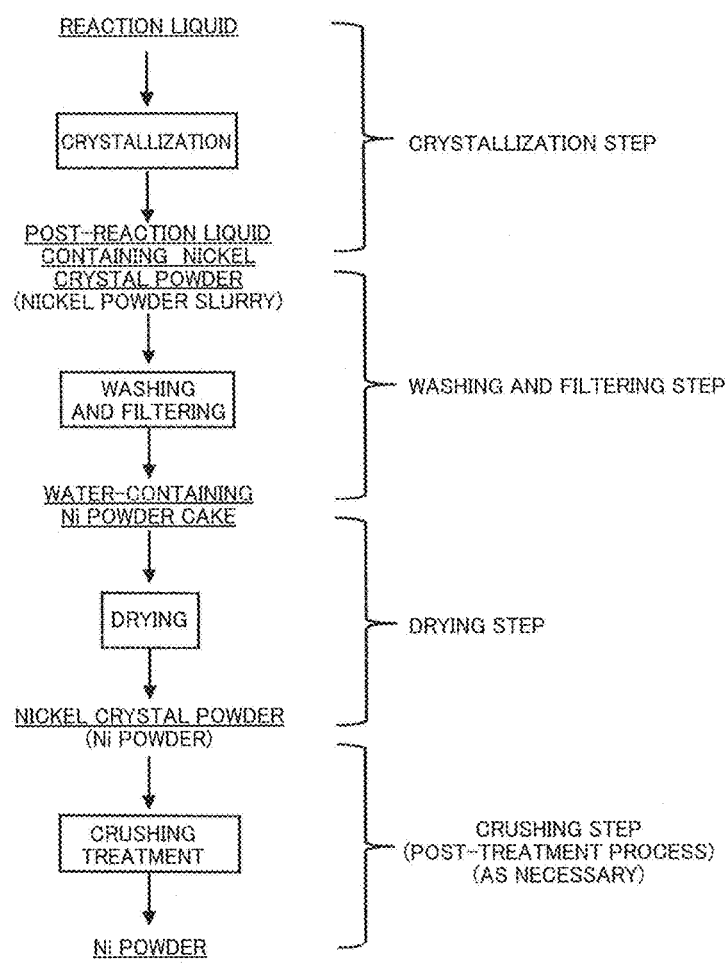
FIG. 1 is a schematic flowchart showing a typical manufacturing process in a method for manufacturing a nickel powder by a wet process.

Hereinafter, as an example of the nickel powder according to the present invention, a nickel powder obtained from a water-containing nickel powder cake as an intermediate will be described. In addition, as a preferable example of the method for manufacturing the nickel powder obtained from a water-containing nickel powder cake as an intermediate according to the present invention, a method for manufacturing a nickel powder using a wet process will be also described in the following order with reference to FIGS. 1 to 7. However, the present invention is not limited to these, and can be modified in any way without departing from a gist of the present invention.

1. Nickel powder
2. Method for manufacturing nickel powder using wet process
   2-1. Crystallization step
   2-1-1. Chemical agents used in crystallization step 2-1-2. Crystallization procedure
2-1-3. Reductive reaction
2-1-4. Reaction start temperature
2-2. Oxide film forming step
2-2-1. Chemical agents used in oxide film forming step
2-2-2. Method and procedure of forming oxide film
2-3. Washing and filtering step
2-3-1. Method and procedure of washing and filtering
2-4. Drying step
2-5. disintegrating step (post-treatment step)

<1. Nickel Powder>

The nickel powder of the present invention has an extremely small content of coarse particles having a particle size of more than 0.8 μm and containing plate-shaped nickel hydroxide as a main component even if the nickel powder is obtained by heating and drying a water-containing nickel powder cake, and therefore high flatness in the nickel paste dry film can be realized. As a result, a short circuit can be effectively prevented between electrodes in a laminate including an internal electrode layer and a dielectric layer, and thus the nickel powder is suitable for applications such as internal electrodes of multilayer ceramic capacitors. In the coarse particles containing plate-shaped nickel hydroxide as a main component, the main component is a component having the highest proportion in the nickel hydroxide generated by oxidation of a nickel crystal powder, that is, the plate-shaped nickel hydroxide is a component having the highest proportion in the whole coarse particles.

The nickel powder of the present invention includes particles having a substantially spherical shape, and the number average particle size of the particles is preferably 0.03 μm to 0.4 μm, more preferably 0.05 μm to 0.3 μm, and still more preferably 0.08 μm to 0.25 μm from the viewpoint of coping with recent thinning of internal electrodes of multilayer ceramic capacitors. Examples of the substantially spherical shape include not only true spheres, but also ellipsoids having a ratio of minor axis to major axis (minor axis/major axis) of 0.8 to 1.0 in a predetermined section (for example, a section passing through the center of a particle).

The average particle size in the present invention is a number average particle size determined from a scanning electron micrograph (SEM image) of the nickel powder. The nickel powder manufactured by the wet process of the present invention described below has sufficiently narrow particle size distribution without classification treatment. That is, in this case, the CV value, which is obtained by dividing the standard deviation of the particle size by the average particle size, is 0.2 or less, and the nickel powder has particle sizes in a narrow range.

Here, the coarse particle containing plate-shaped nickel hydroxide as a main component is a solid substance obtained in the process from the washing and filtering step to the drying step described below as follows. In a state of a water-containing nickel powder cake, the surface of a nickel crystal powder is oxidized by oxygen and the like in the air to generate nickel hydroxide, and an oxide film containing the nickel hydroxide as a main component grows into a plate-shaped crystal to incorporate surrounding nickel crystal powder and bind firmly, and thus a solid substance is obtained. In the oxide film containing nickel hydroxide as a main component, the main component is a component having the highest proportion in the nickel hydroxide generated by oxidation of a nickel crystal powder, that is, the plate-shaped nickel hydroxide is a component having the highest proportion in the whole oxide film.

Figure 3:
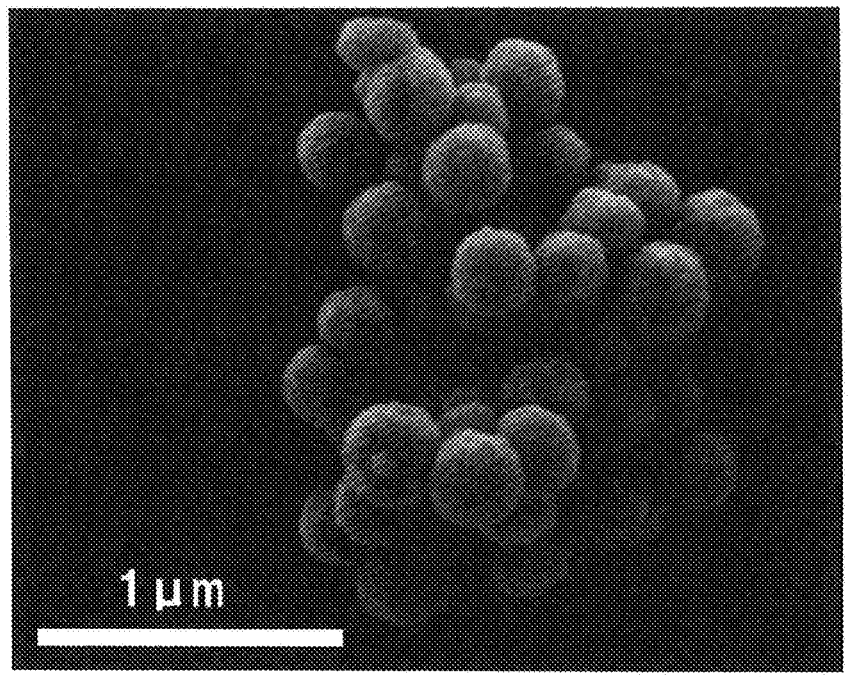
FIG. 3 is a scanning electron micrograph (SEM image) of agglomerated particles of a nickel crystal powder found in a nickel powder before disintegrating treatment in a wet process.
Figure 4:
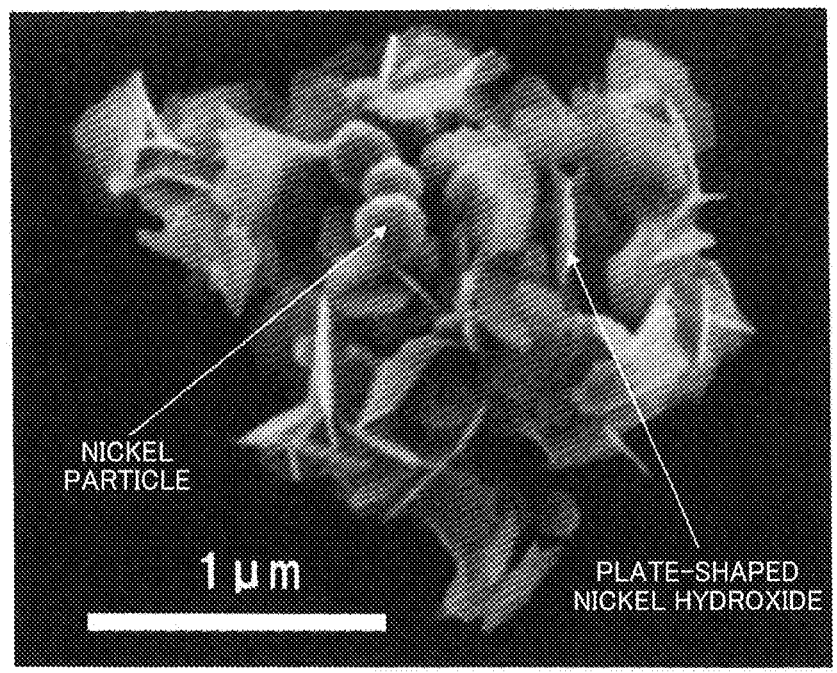
FIG. 4 is a scanning electron micrograph (SEM image) of a coarse particle containing plate-shaped nickel hydroxide as a main component and found in a nickel powder before disintegrating treatment in a wet process.
Figure 5:
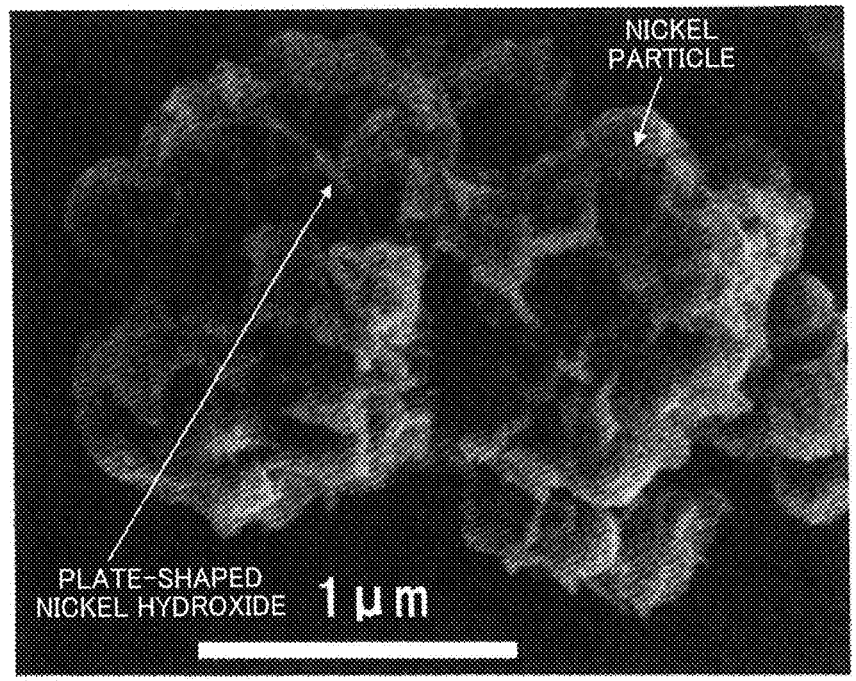
FIG. 5 is a scanning electron micrograph (SEM image), other than the micrograph in FIG. 4, of a coarse particle containing plate-shaped nickel hydroxide as a main component and found in a nickel powder before disintegrating treatment in a wet process.
Figure 6:
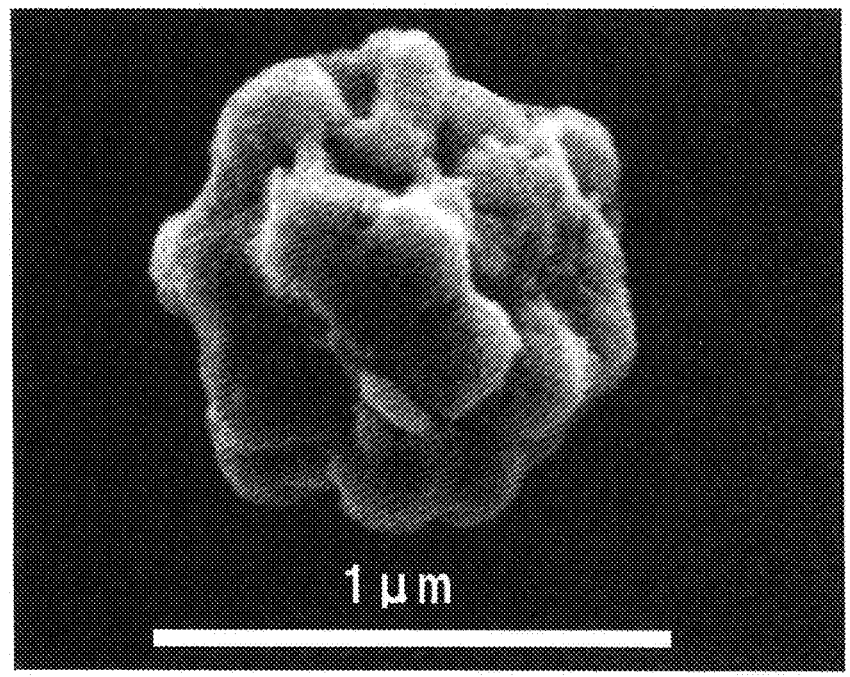
FIG. 6 is a scanning electron micrograph (SEM image) of a coarse particle containing plate-shaped nickel hydroxide as a main component and found in a nickel powder after disintegrating treatment in a wet process.

FIG. 3 shows a scanning electron micrograph (SEM image) of only weakly agglomerated particles of a nickel crystal powder in a state where the coarse particles containing plate-shaped nickel hydroxide as a main component are not formed in the nickel powder before disintegrating treatment in the wet process. Such agglomeration is easily disintegrated with the disintegrating treatment described below, and therefore causes almost no problem. Here, FIGS. 4 to 6 show a scanning electron micrograph (SEM image) of a coarse particle containing plate-shaped nickel hydroxide as a main component and found in a nickel powder obtained by the wet process before and after disintegrating treatment. From FIG. 4 and FIG. 5, it can be confirmed that the coarse particle containing plate-shaped nickel hydroxide as a main component is a solid in which particles of a nickel crystal powder are firmly connected to each other via a nickel hydroxide matrix that has grown into a plate-shaped crystal, and from FIG. 6, it can be found that these coarse particles containing plate-shaped nickel hydroxide as a main component are not easily disintegrated even if subjected to disintegrating treatment. In the coarse particle containing plate-shaped nickel hydroxide as a main component after disintegrating treatment, the nickel hydroxide has a smooth surface shape. This is because during the disintegrating treatment, the action of the collision energy of the particles causes shape change. In the coarse particle, the plate-shaped nickel hydroxide matrix is still present. The coarse particle containing plate-shaped nickel hydroxide as a main component can be identified with the following procedure. The nickel powder is filtered with, for example, a porous track-etch membrane filter described below to separate the coarse particle, and for identification, the coarse particle is analyzed with a method such as energy dispersive X-ray spectroscopy (EDS) or X-ray photoelectron spectroscopy (XPS), and the shape of the coarse particle is observed with a scanning electron microscope (SEM) or the like.

The nickel powder of the present invention can be obtained by heating and drying a water-containing nickel powder cake containing at least a nickel powder and water. The nickel powder includes an oxide film containing a nickel hydroxide basic salt as a main component on the surface, and thus growth of the nickel hydroxide component into a plate-shaped crystal can be suppressed on the surface. The nickel hydroxide basic salt is to include one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$). As described above, growth of the nickel hydroxide component into a plate-shaped crystal is suppressed due to the fact that the nickel powder includes an oxide film containing a nickel hydroxide basic salt, and therefore the content of the coarse particles having a particle size of more than 0.8 μm and containing plate-shaped nickel hydroxide as a main component can be controlled to 200 mass ppm or less, more preferably 150 mass ppm or less, and still more preferably 100 mass ppm or less. Furthermore, the content of the coarse particles having a particle size of more than 1.2 μm and containing plate-shaped nickel hydroxide as a main component can be controlled to 100 mass ppm or less, more preferably 80 mass ppm or less, and still more preferably 50 mass ppm or less.

The effect of the coarse particles of the nickel powder depends on the thickness of the internal electrode layer of the multilayer ceramic capacitor in which the nickel powder is used. In recent thinned internal electrode layers, if the content of the coarse particles having a particle size of more than 0.8 μm and containing plate-shaped nickel hydroxide as a main component is more than 200 mass ppm, or the content of the coarse particles having a particle size of more than 1.2 μm and containing plate-shaped nickel hydroxide as a main component is more than 100 mass ppm, occurrence of a short circuit between electrodes may become remarkable. Needless to say, a smaller content of the coarse particles containing plate-shaped nickel hydroxide as a main component is more preferable, and if the content of the coarse particles having a particle size of more than 0.8 μm and containing plate-shaped nickel hydroxide as a main component is 100 mass ppm or less, or the content of the coarse particles having a particle size of more than 1.2 μm and containing plate-shaped nickel hydroxide as a main component is 50 mass ppm or less, the occurrence rate of a short circuit between electrodes can be sufficiently reduced. The particle size of the coarse particle containing plate-shaped nickel hydroxide as a main component is to be the minor axis length determined from the SEM image.

Usually, the nickel powder may contain a small amount of impurities including impurities in the oxide film containing a nickel hydroxide basic salt as a main component on the surface of the nickel powder. For example, the nickel powder obtained by the wet process may contain, in a trace amount, oxygen due to surface oxidation of nickel particles, chlorine considered to be generated from nickel chloride as a nickel raw material, and an alkali metal such as sodium generated from sodium hydroxide. The nickel powder obtained by the vapor phase process also may contain oxygen due to surface oxidation of nickel particles, and the nickel powder obtained with a production method in which nickel chloride vapor is reduced by hydrogen may contain a trace amount of chloride. These impurities may cause a defect in internal electrodes during manufacture of multilayer ceramic capacitors. Therefore, it is preferable to reduce the impurities as much as possible, and for example, the content of chlorine and an alkali metal in the nickel powder is preferably 0.01 mass % or less.

Like the nickel powder of the present invention, a nickel powder applicable to internal electrodes of multilayer ceramic capacitors usually contains a trace amount of sulfur in some cases in order to suppress the catalytic activity of the nickel powder. This is because the surface of the nickel particle has high catalytic activity, and if the nickel powder is used as it is without containing sulfur or the like, a crack is likely to occur in a laminate in some cases as follows at the time of manufacturing a multilayer ceramic capacitor. In binder removing treatment, thermal decomposition of a binder resin such as an ethyl cellulose (EC) resin contained in an internal electrode paste proceeds, and the binder resin is decomposed from a low temperature. As a result, the strength of the laminate is significantly reduced, and at the same time, a large amount of decomposition gas is generated, and thus a crack is likely to occur in the laminate.

As a method of making a nickel powder contain sulfur as described above, the following method is the most preferable from the viewpoint of exhibiting the effect of suppressing decomposition of the binder resin and from the viewpoint of reducing the influence of sulfur as an impurity on the characteristics of a multilayer ceramic capacitor. In the method, surface treatment (sulfur coating treatment) in which sulfur is adhered to the surface of nickel particles is performed using a sulfur coating agent described below to make the entire surface of the nickel particles into a state of being uniformly modified (coated) with sulfur with a small thickness. However, as long as the effect of suppressing decomposition of the binder resin can be exhibited, the entire surface of the nickel particles is not to be modified (coated), and a state of being modified (coated) is sufficient in which a part of the surface is modified (coated). In the present invention, the term "surface treatment" is used to express a concept including modification (coating) of the whole of such nickel particles and modification (coating) of some of such nickel particles.

If the sulfur content with respect to the nickel powder is large, a defect due to sulfur may occur in the internal electrode. Therefore, the sulfur content is preferably 0.1 mass %·g/m$^2$ or less, more preferably 0.07 mass %·g/m$^2$ or less, and still more preferably 0.04 mass %·g/m$^2$ or less with respect to the specific surface area (m$^2$/g) of the nickel powder. For example, a nickel powder having an average particle size of 0.2 μm has a specific surface area of about 4 m$^2$/g, and therefore its sulfur content is preferably about 0.40 mass % or less, more preferably about 0.28 mass % or less, and still more preferably about 0.16 mass % or less. The lower limit of the sulfur content is not particularly limited, and the content may be extremely small so that the content is undetectable as a result of measurement with an analytical instrument used for content analysis, such as a sulfur analyzer in a combustion method or an inductively coupled plasma (ICP) spectrometer.

If the sulfur content with respect to the specific surface area (m$^2$/g) of the nickel powder is reduced to 0.04 mass %·g/m$^2$ or less, the above-described effect of suppressing decomposition of the binder resin by sulfur becomes small, and thus, in binder removing treatment at the time of manufacturing a multilayer ceramic capacitor, strength reduction and a crack are likely to occur in the laminate. However, in the nickel powder of the present invention, a secondary effect is exhibited such that the oxide film formed on the surface and containing a nickel hydroxide basic salt as a main component hinders a metallic nickel portion having high catalytic activity from contacting with the binder resin to suppress resin decomposition.

Therefore, even if the nickel powder of the present invention is not subjected to sulfur coating treatment in order to reduce the sulfur content, decomposition of the binder resin can be suppressed as long as the oxide film has a thickness of a predetermined value or more. Specifically, in the case of a sulfur content (mass %) of 0.04 mass %·g/m$^2$ or less with respect to the specific surface area (m$^2$/g) of the nickel powder, the oxygen content (mass %) is to be preferably 0.35 mass %·g/m$^2$ or more, and more preferably 0.40 mass %·g/m$^2$ or more with respect to the specific surface area (m$^2$/g) of the nickel powder. For example, a nickel powder having an average particle size of 0.2 μm has a specific surface area of about 4 m$^2$/g, and therefore its oxygen content is preferably about 1.4 mass % or more, and more preferably about 1.6 mass % or more.

<2. Method for Manufacturing Nickel Powder Using Wet Process>

First, the method for manufacturing a nickel powder using a wet process according to an embodiment of the present invention will be described. The method for manufacturing a nickel powder using a wet process according to an embodiment of the present invention includes a crystallization step of crystallizing nickel using a reductive reaction with hydrazine or the like in a strongly alkaline reaction liquid obtained by mixing at least a water-soluble nickel salt, a salt of a metal nobler than nickel, a reducing agent (such as hydrazine), an alkali hydroxide as a pH adjusting agent, and water to obtain a nickel powder slurry as a post-reaction liquid containing a nickel crystal powder, an oxide film forming step of mixing a mixture of the nickel powder in the nickel powder slurry and one or more selected from at least a sulfate ion ($SO_4^{2-}$), a chloride ion ($Cl^-$), a nitrate ion ($NO_3^-$), a carbonate ion ($CO_3^{2-}$), a formic acid ion (HCOO⁻), and an acetate ion ($CH_3COO^-$) and hydrogen peroxide ($H_2O_2$) as an oxidizing agent to form an oxide film containing, as a main component, a basic salt of one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) and nickel hydroxide on the surface of the nickel powder without an oxide film, a washing and filtering step of, while the nickel powder slurry is washed, separating the nickel crystal powder having a surface on which the oxide film containing the nickel hydroxide basic salt as a main component is formed to obtain a water-containing nickel powder cake, and a drying step of drying the water-containing nickel powder cake to obtain the nickel crystal powder (nickel powder) having a surface on which the oxide film containing the nickel hydroxide basic salt as a main component is formed. If necessary, the amine compound and the sulfur-containing compound described below may be blended with the reaction liquid and made to act as a self-decomposition inhibitor for hydrazine (the amine compound, the sulfur-containing compound) and a reductive reaction accelerator (complexing agent) (the amine compound). Furthermore, the disintegrating step performed as necessary may be added as a post-treatment step.

If desired, surface treatment (sulfur coating treatment) may be performed in which, to the nickel powder slurry as a post-reaction liquid containing a nickel crystal powder or to a diluted liquid or a washed liquid of the nickel powder slurry, an extremely small amount of a sulfur coating agent is added to modify the surface of the nickel particles with the sulfur component so that the sulfur content in the nickel powder is 0.5 mass % or less. Examples of the sulfur coating agent include, as inorganic agents, sulfides of an alkali metal such as sodium sulfide ($Na_2S$) and sodium hydrosulfide (NaSH), and as organic agents, mercapto compounds having a mercapto group (another name: thiol group) (—SH) and disulfide compounds having a disulfide group (—S—S—). The mercapto group (—SH) and the disulfide group (—S—S—) in the above-described organic sulfur coating agents, unlike the sulfide group (—S—), the sulfonyl group (—S(=O)$_2$—), the sulfonic acid group (—S(=O)$_2$—O—), the thioketone group (—C(=S)—), and the like in the sulfur-containing compounds described below, directly bind to the nickel element easily on the surface of the nickel crystal powder in the slurry liquid (the bond between S and S in the disulfide group easily breaks to directly bind to the nickel element), and thus, act as a sulfur coating agent effectively. As the mercapto compound, a compound can be used such as mercaptoacetic acid (thioglycolic acid) ($HSCH_2COOH$), thiomalic acid ($HOOCCH(SH)CH_2COOH$), L-cysteine ($HSCH_2CH(NH_2)COOH$), or thioglycerol ($HSCH_2CH(OH)CH_2OH$). As the disulfide compound, dithiodiglycolic acid ($HOOCH_2S$—$SCH_2COOH$) or the like can be used. The obtained nickel powder can be also subjected to heat treatment at about 200° C. to 300° C. in, for example, an inert atmosphere or a reducing atmosphere to obtain a nickel powder. Such sulfur coating treatment and heat treatment can control the above-described binder removing behavior in an internal electrode at the time of manufacturing a multilayer ceramic capacitor and the sintering behavior of the nickel powder, and are therefore very effective as long as used within an appropriate range.

Furthermore, it is preferable to obtain a nickel powder in which coarse particles and the like generated by connection between nickel particles generated in the process of forming nickel particles in the crystallization step are reduced by, as necessary, adding the disintegrating step (post-treatment step) of disintegrating the nickel crystal powder having a surface on which the oxide film containing a nickel hydroxide basic salt as a main component is formed.

Through such a crystallization step, an oxide film forming step, a washing and filtering step, a drying step, and if necessary, a disintegrating step, the nickel powder can be obtained that includes particles having a substantially spherical shape and having a number average particle size of 0.03 μm to 0.4 μm.

(2-1. Crystallization Step)

In the crystallization step, a nickel salt (precisely, nickel ion or nickel complex ion) is reduced using a reductive reaction with a reducing agent such as hydrazine in a reaction liquid obtained by mixing at least a water-soluble nickel salt, a salt of a metal nobler than nickel, a reducing agent, an alkali hydroxide, and water, and thus a nickel powder slurry can be obtained as a post-reaction liquid containing a nickel crystal powder. In the present invention, in the case of using hydrazine, an amine compound and a sulfur-containing compound are mixed into the reaction liquid as necessary, and thus the nickel salt can be reduced in the presence of the amine compound and the sulfur-containing compound while decomposition of the hydrazine as a reducing agent is suppressed.

(2-1-1. Chemical Agents Used in Crystallization Step)

In the crystallization step of the present invention, a reaction liquid is used that contains a nickel salt, a salt of a metal nobler than nickel, a reducing agent, an alkali hydroxide, various chemical agents such as an amine compound and a sulfur-containing compound if necessary, and water. The water as a solvent is to be water having high purity such as ultrapure water (conductivity: 0.06 μS/cm (microsiemens per centimeter)) or pure water (conductivity: 1 μS/cm)) from the viewpoint of reducing the amount of impurities in the nickel powder to be obtained, and pure water, which is inexpensive and easily available, is particularly preferably used. Hereinafter, each of the above-described various chemical agents will be described in detail.

(a) Nickel Salt

The nickel salt used in the present invention is not particularly limited as long as it is easily soluble in water, and for example, one or more can be used that are selected from nickel chloride ($NiCl_2$), nickel sulfate ($NiSO_4$), and nickel nitrate ($Ni(NO_3)_2$). Among these nickel salts, nickel chloride, nickel sulfate, and a mixture thereof are more preferably used.

(b) Salt of Metal Nobler than Nickel

The salt of a metal nobler than nickel has a lower ionization tendency than nickel, so that in reducing and precipitating nickel, the salt of a metal nobler than nickel is reduced before nickel. Therefore, in reducing and precipitating nickel, the salt of a metal nobler than nickel contained in the nickel salt solution is reduced before nickel and acts as a nucleating agent to become an initial nucleus. Therefore, in the nickel crystal powder (nickel powder) obtained as a result of growth of the initial nucleus into a particle, the particle size can be easily controlled and fine particles can be easily obtained in the nickel powder.

The salt of a metal nobler than nickel is to be a metal salt of a metal that is water-soluble and has a lower ionization tendency than nickel, and examples of the salt include water-soluble copper salts and water-soluble noble metal salts such as gold salts, silver salts, platinum salts, palladium salts, rhodium salts, and iridium salts. For example, copper sulfate can be used as a water-soluble copper salt, silver nitrate can be used as a water-soluble silver salt, and palladium (II) sodium chloride, palladium (II) ammonium chloride, palladium (II) nitrate, palladium (II) sulfate, and the like can be used as a water-soluble palladium salt, but the salt of a metal nobler than nickel is not limited to these salts.

The above-described palladium salts are particularly preferably used as the salt of a metal nobler than nickel because the particle size of the obtained nickel powder can be controlled so that the nickel powder includes further fine particles although the particle size distribution is wide to some extent. In the case of using the palladium salt, the ratio of the palladium salt to nickel [mol ppm] (number of moles of palladium salt/number of moles of nickel×$10^6$) can be appropriately selected according to the target number average particle size of the nickel powder. For example, in a case where the average particle size of the nickel powder is set to 0.03 μm to 0.4 μm, the ratio of the palladium salt to nickel is to be in the range of 0.2 mol ppm to 100 mol ppm, and preferably in the range of 0.5 mol ppm to 25 mol ppm. If the ratio is less than 0.2 mol ppm, the average particle size of the obtained nickel powder may be more than 0.4 μm. If the ratio is more than 100 mol ppm, a large amount of expensive palladium salt is used, and the cost of the nickel powder may be increased.

(c) Reducing Agent

The reducing agent used in the crystallization step of the present invention is not particularly limited, and examples thereof include hydrazine ($N_2H_4$, molecular weight: 32.05). Hydrazine exists in the forms of anhydrous hydrazine and hydrous hydrazine ($N_2H_4 \cdot H_2O$, molecular weight: 50.06) as a hydrazine hydrate, and may be used in both forms. The reductive reaction of hydrazine is as shown in the formula (2) described below, and is characterized in that the reducing power is high particularly in an alkaline condition, that no impurity component due to the reductive reaction is generated in the reaction liquid because the by-products of the reductive reaction are a nitrogen gas and water, that the amount of the impurities in hydrazine is small from the first, and that hydrazine is easily available. Therefore, hydrazine is suitable as a reducing agent, and for example, commercially available industrial grade 60 mass % hydrous hydrazine can be used.

(d) Alkali Hydroxide

As shown in the formula (2) described below, the higher the alkalinity of the reaction liquid is, the higher the reducing power of hydrazine is. Therefore, in the present invention, an alkali hydroxide can be used as a pH adjusting agent for increase of the alkalinity in the crystallization step. The alkali hydroxide is not particularly limited, but an alkali metal hydroxide is preferably used from the viewpoint of easy availability and cost. Specifically, one or more selected from sodium hydroxide (NaOH) and potassium hydroxide (KOH) are more preferably used.

The blending amount of the alkali hydroxide is to be determined so that the reaction liquid has a pH of 9.5 or more, preferably 10 or more, and more preferably 10.5 or more at the reaction temperature to increase the reducing power of hydrazine as a reducing agent sufficiently. In comparison between, for example, the pH of the reaction liquid at 25° C. and that at about 70° C., the pH at a higher temperature of 70° C. is lower to some extent.

(e) Amine Compound

As described above, an amine compound has actions as a self-decomposition inhibitor for hydrazine, a reductive reaction accelerator, and a connection inhibitor between nickel particles, and therefore is to be added to the reaction liquid as necessary. As the amine compound, a compound can be used that includes two or more of a functional group selected from a primary amino group (—$NH_2$) and a secondary amino group (—NH—) in the molecule, and for example, at least one of an alkyleneamine or an alkyleneamine derivative can be used. For example, an amine compound is preferably used that has at least the structure of the formula A described below in which nitrogen atoms in amino groups in a molecule are bonded via a carbon chain having two carbon atoms.

[Chem. 1]

A

More specifically, as an alkyleneamine, one or more can be used that are selected from ethylenediamine ($H_2NC_2H_4NH_2$), diethylenetriamine ($H_2NC_2H_4NHC_2H_4NH_2$), triethylenetetramine ($H_2N(C_2H_4NH)_2C_2H_4NH_2$), tetraethylenepentamine ($H_2N(C_2H_4NH)_3C_2H_4NH_2$), pentaethylenehexamine ($H_2N(C_2H_4NH)_4C_2H_4NH_2$), and propylenediamine ($CH_3CH(NH_2)CH_2NH_2$). As an alkyleneamine derivative, one or more can be used that are selected from tris(2-aminoethyl)amine ($N(C_2H_4NH_2)_3$), N-(2-aminoethyl)ethanolamine ($H_2NC_2H_4NHC_2H_4OH$), N-(2-aminoethyl) propanolamine ($H_2NC_2H_4NHC_3H_6OH$), 2,3-diaminopropionic acid ($H_2NCH_2CH(NH)COOH$), 1,2-cyclohexanediamine ($H_2NC_6H_{10}NH_2$), ethylenediamine-N,N'-diacetic acid (another name: ethylene-N,N'-diglycine, $HOOCCH_2NHC_2H_4NHCH_2COOH$), N,N'-diacetylethylenediamine ($CH_3CONHC_2H_4NHCOCH_3$), N,N'-dimethylethylenediamine ($CH_3NHC_2H_4NHCH_3$), N,N'-diethylethylenediamine ($C_2H_5NHC_2H_4NHC_2H_5$), N,N'-diisopropylethylenediamine ($CH_3(CH_3)CHNHC_2H_4NHCH(CH_3)CH_3$), and 1,2-cyclohexanediamine ($H_2NC_6H_{10}NH_2$). These alkyleneamines and alkyleneamine derivatives are water-soluble, and among them, ethylenediamine and diethylenetriamine are preferable because they are easily available and inexpensive.

The action of the amine compound as a reductive reaction accelerator is considered to be due to the action as a complexing agent for formation of a nickel complex ion by complexing a nickel ion ($Ni^{2+}$) in the reaction liquid. The actions as a self-decomposition inhibitor for hydrazine and as a connection inhibitor between nickel particles are presumed to be exhibited due to the interaction between the primary amino group (—$NH_2$) or the secondary amino group (—NH—) in the amine compound molecule and the surface of the nickel crystal powder in the reaction liquid.

The alkyleneamine or the alkyleneamine derivative, which is an amine compound, preferably has the above-described structure of the formula A in which nitrogen atoms in amino groups in a molecule are bonded via a carbon chain having two carbon atoms. This is because the effect of suppressing decomposition of hydrazine molecules is increased. For example, it is considered that if the nitrogen atoms in the amino groups strongly adsorbed onto the nickel crystal powder are bonded via a carbon chain having three or more carbon atoms, the amine compound molecule has a high degree of freedom in motion at the carbon chain portion (flexibility of the molecule) due to the long carbon chain. As a result, it is considered that the contact of hydrazine molecules with the nickel crystal powder cannot be effectively blocked and thus the number of hydrazine molecules self-decomposed by the catalytic activity of nickel is increased to reduce the effect of suppressing self-decomposition of hydrazine.

In fact, it has been confirmed that trimethylenediamine (another name: 1,3-diaminopropane, 1,3-propanediamine) ($H_2NC_3H_6NH_2$) in which nitrogen atoms in amino groups in the molecule are bonded via a carbon chain having three carbon atoms is inferior in action of suppressing self-decomposition of hydrazine to ethynediamine ($H_2NC_2H_4NH_2$) and propylenediamine (another name: 1,2-diaminopropane, 1,2-propanediamine) ($CH_3CH(NH_2)CH_2NH_2$) in which nitrogen atoms in amino groups in the molecule are bonded via a carbon chain having two carbon atoms.

Here, the ratio [mol %] of the amine compound to nickel in the reaction liquid ((number of moles of amine compound/number of moles of nickel)×100) is in the range of 0.01 mol % to 5 mol %, and preferably in the range of 0.03 mol % to 2 mol %. If the ratio is less than 0.01 mol %, the amount of the amine compound may be too small to obtain actions as a self-decomposition inhibitor for hydrazine, a reductive reaction accelerator, and a connection inhibitor between nickel particles. If the ratio is more than 5 mol %, the action as a complexing agent for formation of a nickel complex ion by the amine compound is too strong, and as a result, the particle growth in the nickel crystal powder may be abnormal, and the characteristics of the nickel powder may deteriorate. For example, the granularity or the sphericity of the nickel powder may be lost to form particles having a distorted shape, or many coarse particles may be formed in which nickel particles are connected to each other.

(f) Sulfur-Containing Compound (Self-Decomposition Suppressing Auxiliary Agent for Hydrazine)

The sulfur-containing compound is a compound applied to a brightener for nickel plating and a stabilizer for a plating bath, and in the case of using the sulfur-containing compound alone, the action of suppressing self-decomposition of hydrazine is not so large as that of the amine compound. However, the sulfur-containing compound has an interaction such as adsorption with the surface of nickel particles, and has the action as a self-decomposition suppressing auxiliary agent for hydrazine such that when the sulfur-containing compound is used in combination with the amine compound, the action of suppressing self-decomposition of hydrazine is significantly enhanced. Therefore, the sulfur-containing compound is to be added to the reaction liquid as necessary. The sulfur-containing compound includes one or more of sulfide group (—S—), a sulfonyl group (—S(=O)$_2$—), a sulfonic acid group (—S(=O)$_2$—O—), or a thioketone group (—C(=S)—) in the molecule. The sulfur-containing compound also has an action as a connection inhibitor between nickel particles in addition to the action as a self-decomposition suppressing auxiliary agent for hydrazine, and when the sulfur-containing compound is used in combination with the amine compound, the amount of generated coarse particles in which nickel particles are connected to each other can be further effectively reduced.

As the sulfur-containing compound, for example, a sulfide compound having a sulfide group (—S—) in the molecule and having higher water solubility is more preferable. Therefore, the sulfur-containing compound is preferably any one of a carboxy group-containing sulfide compound, a hydroxyl group-containing sulfide compound, and an amino group-containing sulfide compound that further include one or more of a carboxy group (—COOH), a hydroxyl group (—OH), and an amino group (primary: —NH$_2$, secondary: —NH—, tertiary: —N<), respectively. In addition, a thiazole ring-containing sulfide compound including one or more of a thiazole ring ($C_3H_3NS$) is also applicable although the water solubility is not high. More specifically, one or more are preferable that are selected from L (or D, or DL)-methionine ($CH_3SC_2H_4CH(NH_2)$ COOH), L (or D, or DL)-ethionine ($C_2H_5SC_2H_4CH(NH_2)COOH$), N-acetyl-L (or D, or DL)-methionine ($CH_3SC_2H_4CH(NH(COCH_3))COOH$), lanthionine (another name: 3,3'-thiodialanine) (HOOCCH($NH_2$)$CH_2SCH_2CH(NH_2)COOH$), thiodipropionic acid (another name: 3,3'-thiodipropionic acid) (HOOC$C_2H_4SC_2H_4$COOH), thiodiglycolic acid (another name: 2,2'-thiodiglycolic acid, 2,2'-thiodiacetic acid, 2,2'-thiobisacetic acid, mercaptodiacetic acid) (HOOC$CH_2SCH_2$COOH), methionol (another name: 3-methylthio-1-propanol) ($CH_3SC_3H_6OH$), thiodiglycol (another name: 2,2'-thiodiethanol) ($HOC_2H_5SC_2H_5OH$), thiomorpholine ($C_4H_9NS$), thiazole ($C_3H_3NS$), and benzothiazole ($C_7H_5NS$). Among these compounds, methionine and thiodiglycolic acid are preferable because they have excellent self-decomposition suppressing auxiliary action for hydrazine, and are easily available and inexpensive.

As the sulfur-containing compound other than the sulfide compounds, more specifically, one or more are preferable that are selected from saccharin (another name: o-benzoic sulfimide, o-sulfobenzimide) ($C_7H_5NO_3S$), sodium dodecyl sulfate ($C_{12}H_{25}OS(O)_2ONa$), dodecylbenzene sulfonic acid ($C_{12}H_{25}C_6H_4S(O)_2OH$), sodium dodecylbenzene sulfonate ($C_{12}H_{25}C_6H_4S(O)_2ONa$), sulfosuccinic acid bis(2-ethylhexyl) ester sodium salt (another name: di-2-ethylhexyl sodium sulfosuccinate, dioctyl sulfosuccinate sodium salt) ($NaOS(O)_2CH(COOCH_2CH(C_2H_5)C_4H_9)CH_2$ ($COOCH_2CH(C_2H_5)C_4H_9$), and thiourea ($H_2NC(S)NH_2$). These sulfur-containing compounds are water-soluble, and among these compounds, saccharin and thiourea are preferable because they have excellent self-decomposition suppressing auxiliary action for hydrazine, and are easily available and inexpensive.

The actions of the sulfur-containing compound as a self-decomposition suppressing auxiliary agent for hydrazine and as a connection inhibitor between nickel particles can be presumed as follows. That is, in the sulfur-containing compound, the sulfide group (—S—), the sulfonyl group (—S(=O)$_2$—), the sulfonic acid group (—S(=O)$_2$—O—), or the thioketone group (—C(=S)—) in the molecule is adsorbed onto the nickel surface of the nickel particle with intermolecular force, but in the case of using the sulfur-containing compound alone, the action of covering and protecting the nickel crystal powder is not so large as that in the amine compound molecule. When the amine compound molecules are strongly adsorbed onto the surface of the nickel crystal powder to cover and protect the powder, there is a high possibility that a minute region is generated that is not completely covered by the amine compound molecules. But if the amine compound and the sulfur-containing compound are used in combination, the sulfur-containing compound molecules are adsorbed onto the region to cover the region supplementarily, and thus the contact between the hydrazine molecules and the nickel crystal powder in the reaction liquid is further effectively hindered, and combining of particles of the nickel crystal powder can be further strongly prevented, and as a result, the above-described action is exhibited.

Here, the ratio [mol %] of the sulfur-containing compound to nickel in the reaction liquid ((number of moles of sulfur-containing compound/number of moles of nickel)×100) is in the range of 0.01 mol % to 5 mol %, preferably in the range of 0.03 mol % to 2 mol %, and more preferably in the range of 0.05 mol % to 1 mol %. If the ratio is less than 0.01 mol %, the amount of the sulfur-containing compound may be too small to obtain actions as a self-decomposition suppressing auxiliary agent for hydrazine and as a connection inhibitor between nickel particles. Meanwhile, even if the ratio is more than 5 mol %, the actions are not improved, only resulting in an increase in the amount of the sulfur-containing compound used. Thus, the cost of the chemical agent is increased, and at the same time, the blending amount of the organic component in the reaction liquid is increased to increase the chemical oxygen demand (COD) of the waste liquid of the reaction in the crystallization step, resulting in an increase in the waste liquid treatment cost.

(g) Another Contained Material

The reaction liquid in the crystallization step may contain small amounts of various additives, such as a dispersing agent, a complexing agent, and a defoaming agent, in addition to the above-described nickel salt, salt of a metal nobler than nickel, reducing agent (such as hydrazine), alkali hydroxide, and amine compound. For example, if an appropriate dispersing agent or complexing agent is used in an appropriate amount, the granularity (sphericity) or the surface smoothness of the nickel crystal powder can be improved, or the coarse particles can be reduced in some cases. Furthermore, if an appropriate defoaming agent is used in an appropriate amount, foaming in the crystallization step due to a nitrogen gas generated in the crystallization reaction (see the formulae (2) to (4) described below) can be suppressed to prevent, for example, the aqueous solution from overflowing from the container. As the dispersing agent, known substances can be used, and examples of the dispersing agent include alanine ($CH_3CH(COOH)NH_2$), glycine ($H_2NCH_2COOH$), triethanolamine ($N(C_2H_4OH)_3$), and diethanolamine (another name: iminodiethanol) ($NH(C_2H_4OH)_2$). As the complexing agent, known substances can be used. Examples of the complexing agent include hydroxycarboxylic acids, carboxylic acids (organic acids including at least one carboxyl group), hydroxycarboxylates, hydroxycarboxylic acid derivatives, carboxylates, and carboxylic acid derivatives, and specific examples of the complexing agent include tartaric acid, citric acid, malic acid, ascorbic acid, formic acid, acetic acid, pyruvic acid, and salts and derivatives thereof. The defoaming agent is not particularly limited as long as it has excellent defoaming property under an alkaline condition, and an oil-type or solvent-type silicone-based or non-silicone-based defoaming agent can be used.

(2-1-2. Crystallization Procedure)

In the crystallization step, a nickel salt solution in which at least a water-soluble nickel salt and a salt of a metal nobler than nickel are dissolved in water, a reducing agent solution in which a reducing agent (such as hydrazine) is dissolved in water, and an alkali hydroxide solution in which an alkali hydroxide is dissolved in water are prepared, and mixed to prepare a reaction liquid. Then, a crystallization reaction is carried out in which nickel particles are crystallized using a reductive reaction in the reaction liquid to obtain nickel crystal powder. The amine compound and the sulfur-containing compound to be added as necessary can be added and mixed into any of the above-described solutions or a mixture of the solutions before preparation of the reaction liquid, or can be added and mixed into the reaction liquid after preparation of the reaction liquid. In a room temperature environment, the reductive reaction starts at the time of preparing the reaction liquid.

As a specific crystallization procedure, there are the following two kinds of procedures. In one procedure, a reducing agent/alkali hydroxide solution containing a reducing agent (such as hydrazine) and an alkali hydroxide obtained by mixing a reducing agent solution and an alkali hydroxide solution in advance is added and mixed into a nickel salt solution containing a nickel salt as a material to be reduced and containing a salt of a metal nobler than nickel, and thus a reaction liquid is prepared. In another procedure, an alkali hydroxide is added and mixed into a nickel salt/reducing agent solution obtained by adding and mixing a reducing agent (such as hydrazine) into the above-described nickel salt solution, and thus a reaction liquid is prepared. The two procedures are different in that in the former procedure, a reducing agent (such as hydrazine) having a high alkalinity and enhanced reducing power by an alkali hydroxide is added and mixed into a nickel salt solution containing a material to be reduced, whereas in the latter procedure, a reducing agent (such as hydrazine) is mixed into a nickel salt solution containing a material to be reduced in advance, and then the pH is adjusted (increased) by an alkali hydroxide to enhance the reducing power.

In the former procedure (in the case of adding and mixing a nickel salt solution with a reducing agent/alkali hydroxide solution), if the time required for adding and mixing a nickel salt solution (a solution containing a nickel salt and a salt of a metal nobler than nickel) with a reducing agent/alkali hydroxide solution having a high alkalinity and enhanced reducing power by an alkali hydroxide (hereinafter, also referred to as raw material mixing time) is long, the alkalinity increases locally in the region where the nickel salt solution and the reducing agent/alkali hydroxide solution are added and mixed from the middle phase of the adding and mixing, and thus the reducing power of hydrazine is enhanced, and as a result, nucleation occurs due to the salt of a metal nobler than nickel as a nucleating agent, although the result depends on the temperature at the time of preparing the reaction liquid, that is, at the time of start of the reductive reaction (hereinafter, also referred to as reaction start temperature). Therefore, the nucleation greatly depends on the raw material mixing time so that the nucleation action of the added nucleating agent is weaker at a phase closer to the end of the raw material mixing time, and it tends to be difficult for the nickel crystal powder to have fine particles and narrow particle size distribution. This tendency is more remarkable in the case of adding and mixing an alkaline reducing agent/alkali hydroxide solution with a weakly acidic nickel salt solution. The tendency can be suppressed more as the raw material mixing time is shorter, and therefore the mixing time is preferably short. However, considering the restriction on mass production equipment and the like, the raw material mixing time is preferably 10 seconds to 180 seconds, more preferably 10 seconds to 120 seconds, and still more preferably 10 seconds to 80 seconds.

In the latter procedure (in the case of adding and mixing an alkali hydroxide solution with a nickel salt/reducing agent solution obtained by adding and mixing a nickel salt solution with a reducing agent solution), hydrazine as a reducing agent is added and mixed in advance to obtain a uniform concentration of hydrazine in the nickel salt/reducing agent solution containing a nickel salt, a salt of a metal nobler than nickel, and a reducing agent. Therefore, the nucleation that occurs at the time of adding and mixing an alkali hydroxide solution depends on the alkali hydroxide raw material mixing time not so greatly as in the former procedure, and the latter procedure is characterized in that the nickel crystal powder easily has fine particles and narrow particle size distribution. However, the mixing time of the alkali hydroxide solution is preferably short for the same reason as in the former procedure, and considering the restriction on mass production equipment and the like, the mixing time is preferably 10 seconds to 180 seconds, more preferably 10 seconds to 120 seconds, and still more preferably 10 seconds to 80 seconds.

As a procedure of adding and mixing the amine compound and the sulfur-containing compound of the present invention, there are also two kinds of procedures as described above, that is, a procedure in which each compound is blended with a reaction liquid in advance before preparation of the reaction liquid, and a procedure in which each compound is added and mixed after a reaction liquid is prepared and the reductive reaction starts.

In the former procedure (in the case of blending the amine compound and the sulfur-containing compound with a reaction liquid in advance before preparation of the reaction liquid), the amine compound and the sulfur-containing compound are blended with the reaction liquid in advance, and therefore there is an advantage that various actions of the amine compound and the sulfur-containing compound are exhibited from the start of nucleation that occurs due to a salt of a metal nobler than nickel (nucleating agent). Meanwhile, there is a possibility that the interactions, such as adsorption, of the amine compound and the sulfur-containing compound with the surface of nickel particles are involved in nucleation to affect the particle size and the particle size distribution of the obtained nickel crystal powder.

In the latter procedure (in the case of preparing a reaction liquid and adding and mixing the amine compound and the sulfur-containing compound after start of the reductive reaction), after the very initial phase of the crystallization step in which nucleation occurs due to the nucleating agent, the amine compound and the sulfur-containing compound are added and mixed into the reaction liquid. Therefore, the above-described actions of the amine compound and the sulfur-containing compound are somewhat delayed. However, there is an advantage that the particle size and the particle size distribution of the obtained nickel crystal powder are less likely to be affected by the amine compound and the sulfur-containing compound, and are easy to control because the amine compound and the sulfur-containing compound are no longer involved in the nucleation. Here, in the adding and mixing in this procedure, the amine compound and the sulfur-containing compound may be added to the reaction liquid at once over a mixing time of within several seconds, or may be added in portions or in drops over a mixing time of from several minutes to about 30 minutes. As described above, the amine compound acts as a reductive reaction accelerator (complexing agent). Therefore, the more slowly the amine compound is added, the more slowly crystals grow to obtain a nickel crystal powder having high crystallinity. As a result, however, self-decomposition of hydrazine is suppressed only gradually, and the effect of reducing hydrazine consumption deteriorates. The mixing time is to be appropriately determined considering the balance between the above-described actions. The timing of adding and mixing the amine compound and the sulfur-containing compound in the former procedure can be comprehensively judged according to the purpose and appropriately selected.

In the adding and mixing of a nickel salt solution with a reducing agent/alkali hydroxide solution, the adding and mixing of a nickel salt solution with a reducing agent solution, and the adding and mixing of an alkali hydroxide solution into a nickel salt/reducing agent solution, the solutions are preferably stirred and mixed, that is, mixed while stirred. If the solutions have a good stirring and mixing property, the frequency of non-uniform nucleation decreases although the frequency depends on the nucleation site, and the dependence of nucleation on the raw material mixing time and the dependence of nucleation on the alkali hydroxide mixing time as described above decrease, and as a result, the nickel crystal powder easily have fine particles and narrow particle size distribution. As a method of stirring and mixing, a known method is to be used, and a stirring blade is preferably used from the viewpoint of controlling the stirring and mixing property and the viewpoint of the equipment cost.

(2-1-3. Reductive Reaction)

In the crystallization step, in the reaction liquid, an alkali hydroxide and a salt of a metal nobler than nickel coexist, and under the coexistence, a nickel salt is reduced by hydrazine to obtain a nickel crystal powder. If necessary, self-decomposition of hydrazine can be significantly suppressed by the actions of an extremely small amount of a specific amine compound and an extremely small amount of a specific sulfur-containing compound to carry out a reductive reaction.

First, the reductive reaction in the crystallization step will be described. The reaction in a case where a nickel ion ($Ni^{2+}$) crystallizes and becomes nickel (Ni) is a two-electron reaction of the formula (1) described below. The reaction of hydrazine is a four-electron reaction of the formula (2) described below. For example, in a case where nickel chloride ($NiCl_2$) is used as the nickel salt and sodium hydroxide (NaOH) is used as the alkali hydroxide as described above, the entire reductive reaction is represented by a reaction as shown in the formula (3) described below in which nickel hydroxide generated by a neutralization reaction between nickel chloride and sodium hydroxide is reduced by hydrazine, and stoichiometrically (as theoretical values), 1 mol of nickel (Ni) needs 0.5 mol of hydrazine.

Here, from the reductive reaction of hydrazine shown in the formula (2), it can be seen that hydrazine has greater reducing power as the alkalinity is stronger. The alkali hydroxide is used as a pH adjusting agent to increase the alkalinity of the reaction liquid, and plays a role in promoting the reductive reaction of hydrazine.

[Chem. 2]

$$Ni^{2+} + 2e^- \rightarrow Ni\downarrow \text{ (two-electron reaction)} \quad (1)$$

$$N_2H_4 \rightarrow N_2\uparrow + 4H^+ + 4e^- \text{ (four-electron reaction)} \quad (2)$$

$$2NiCl_2 + N_2H_4 + 4NaOH \rightarrow 2Ni(OH)_2 + N_2H_{4+4}NaCl \rightarrow 2Ni\downarrow + N_2\uparrow + 4NaCl + 4H_2O \quad (3)$$

As described above, in a conventional crystallization step, the active surface of a nickel crystal powder serves as a catalyst to promote the self-decomposition reaction of hydrazine represented by the formula (4) described below, and a large amount of hydrazine as a reducing agent is consumed in a process other than reduction in some cases. Therefore, hydrazine has been generally used in an amount of, for example, about 4 times the above-described theoretical value required for reduction, that is, in an amount of about 2 mol with respect to 1 mol of nickel, although the amount depends on the crystallization conditions such as the reaction start temperature. Furthermore, as shown in the formula (4), in self-decomposition of hydrazine, a large amount of ammonia is produced as a by-product, so that the reaction liquid contains a high concentration of ammonia, and as a result, a nitrogen-containing waste liquid is generated. As described above, the use of an excessive amount of hydrazine, which is an expensive chemical agent, and the generation of the treatment cost for the nitrogen-containing waste liquid cause an increase in the cost of manufacturing a nickel powder by a wet process (wet process nickel powder).

[Chem. 3]

$$3N_2H_4 \rightarrow N_2\uparrow + 4NH_3 \qquad (4)$$

Therefore, in the method for manufacturing the nickel powder of the present invention, it is preferable to reduce the amount of use of hydrazine, which is an expensive chemical agent, significantly by adding an extremely small amount of a specific amine compound and an extremely small amount of a specific sulfur-containing compound to the reaction liquid to suppress the self-decomposition reaction of hydrazine remarkably. It is considered that the specific amine compound can suppress the self-decomposition of hydrazine as follows. (I) The molecules of the specific amine compound and the specific sulfur-containing compound are adsorbed onto the surface of the nickel crystal powder in the reaction liquid, and thus physically interferes with the contact between the active surface of the nickel crystal powder and the hydrazine molecules. (II) The specific amine compound and the specific sulfur-containing compound act on the surface of the nickel crystal powder to inactivate the catalytic activity of the surface.

In a conventional crystallization step with a wet process, a complexing agent, such as tartaric acid or citric acid, that forms a complex ion with a nickel ion ($Ni^{2+}$) to increase the concentration of ionic nickel is generally used as a reductive reaction accelerator in order to shorten the reductive reaction time (crystallization reaction time) to a practical range. However, the complexing agents such as tartaric acid and citric acid do not have an action as a self-decomposition inhibitor for hydrazine such as the action of the specific amine compound or sulfur-containing compound, and do not have an action as a connection inhibitor that inhibits formation of coarse particles generated by connection between nickel particles in the crystallization.

Meanwhile, the specific amine compound also acts as a complexing agent like tartaric acid and citric acid, and has an advantage of having actions as a self-decomposition inhibitor for hydrazine, a connection inhibitor, and a reductive reaction accelerator.

(2-1-4. Reaction Start Temperature)

The crystallization reaction in the crystallization step starts in a reaction liquid obtained by adding and mixing, for example, a solution containing a reducing agent (such as hydrazine) and containing an alkali hydroxide (reducing agent/alkali hydroxide solution) into a solution containing at least a water-soluble nickel salt and a salt of a metal nobler than nickel (nickel salt solution). In this case, the reaction start temperature of the crystallization reaction is preferably 40° C. to 95° C., more preferably 50° C. to 80° C., and still more preferably 60° C. to 70° C. The temperatures of the nickel salt solution and the temperature of the reducing agent/alkali hydroxide solution are not particularly limited as long as the temperature of the mixed liquid obtained by premixing the two solutions, that is, the reaction start temperature is within the above-described temperature range, and can be set freely.

The higher the reaction start temperature is, the more the reductive reaction is promoted, and the more likely the nickel crystal powder is to have high crystallinity. Meanwhile, the self-decomposition reaction of hydrazine is promoted more than the reductive reaction, and therefore the amount of hydrazine consumed is increased, and the reaction liquid tends to foam more intensely. Therefore, if the reaction start temperature is too high, the amount of hydrazine consumed is significantly increased, or the crystallization reaction cannot be continued due to a large amount of foam in some cases. If the reaction start temperature is too low, the crystallinity of the nickel crystal powder tends to significantly deteriorate, or the productivity of the nickel powder tends to deteriorate because of significantly extended time of the crystallization step due to delay in the reductive reaction. For the above-described reasons, if the temperature is set in the above-described range, a high-performance nickel powder can be manufactured at low cost while the amount of hydrazine consumed is reduced and while the high productivity is maintained.

(2-2. Oxide Film Forming Step)

In the oxide film forming step, a mixture of a nickel powder without an oxide film and one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) and hydrogen peroxide ($H_2O_2$) are mixed to form an oxide film, on the surface of the nickel powder, containing, as a main component, a basic salt of one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) and nickel hydroxide.

For example, the nickel powder slurry as a post-reaction liquid containing the nickel crystal powder (nickel powder) without an oxide film obtained by the reductive reaction in the crystallization step or the diluted liquid of the slurry is made to contain one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$), and then hydrogen peroxide ($H_2O_2$) as an oxidizing agent is added to form an oxide film containing, as a main component, a nickel hydroxide basic salt containing one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) on the surface of the nickel crystal powder (nickel powder) without an oxide film (oxide film forming step). By forming such an oxide film, it is possible to suppress growth of the nickel hydroxide component in the oxide film into a plate-shaped crystal, and effectively suppress generation of coarse particles containing plate-shaped nickel hydroxide as a main component.

The reason why growth of the nickel hydroxide component into a plate-shaped crystal can be suppressed in the oxide film containing a nickel hydroxide basic salt as a main component is considered to be that, for example, in a nickel hydroxide basic salt including an anion ($SO_4^{2-}$, $Cl^-$, $NO_3^-$, $CO_3^{2-}$, $HCO_3^-$, $HCO_2^-$, $CH_3CO_2^-$, or the like) as a component as shown in the formula (5), the crystallinity of nickel hydroxide is lower than that of high-purity nickel hydroxide, and the rate of crystal growth such as Ostwald ripening is significantly reduced. It is expected that this reduction in the rate of crystal growth leads to suppression of generation of coarse particles containing plate-shaped nickel hydroxide as a main component.

[Chem. 4]

$$Ni(OH)_{2-x}(A)_x \quad (5)$$

(A: ½SO$_4$, Cl, NO$_3$, ½CO$_3$, HCO$_2$, CH$_3$CO$_2$; 0<X)

(2-2-1. Chemical Agents Used in Oxide Film Forming Step)

In the oxide film forming step of the present invention, for example, in the nickel powder slurry as a post-reaction liquid in the crystallization step or a diluted liquid of the slurry, an oxidizing agent is used to form an oxide film on the surface of the nickel crystal powder (nickel powder). Furthermore, the nickel powder slurry is made to contain an anionic component for formation of a basic salt so that the oxide film contains a nickel hydroxide basic salt as a main component.

(h) Oxidizing Agent

The oxidizing agent that can be used in the present invention is not particularly limited as long as it is easily soluble in water and can form an oxide film containing a nickel hydroxide basic salt as a main component on the surface of the nickel crystal powder (nickel powder) to suppress growth of the nickel hydroxide component into a plate-shaped crystal. For example, one or more selected from air, an oxygen gas (such as oxygen dissolved in water), and hydrogen peroxide (H$_2$O$_2$) can be used. Among these oxidizing agents, industrial hydrogen peroxide solution (H$_2$O$_2$: 30 mass % to 60 mass %) is more preferably used from the viewpoint of being inexpensive and easily available, and having a high effect of suppressing growth of the nickel hydroxide component into a plate-like crystal.

For example, in the case of using hydrogen peroxide (H$_2$O$_2$) as an oxidizing agent, 1 mol of nickel hydroxide is to be formed for 1 mol of hydrogen peroxide (H$_2$O$_2$) as shown in the formula (6), and in a case where the nickel powder slurry contains an anion (such as SO$_4^{2-}$, Cl$^-$, NO$_3^-$, CO$_3^{2-}$, HCO$_3^-$, HCO$_2^-$, or CH$_3$CO$_2^-$), it is considered that 1 mol of a nickel hydroxide basic salt as shown in the formula (5) described above is formed for 1 mol of hydrogen peroxide (H$_2$O$_2$).

[Chem. 5]

$$Ni + H_2O_2 \rightarrow Ni(OH)_2 \quad (6)$$

Note that it is not sufficient that the oxidizing agent has only an oxidizing action to form an oxide film on the surface of the nickel crystal powder (nickel powder). For example, in the case of using hypochlorous acid (HClO) or sodium hypochlorite (NaClO) as an oxidizing agent, an oxide film can be formed on the surface of the nickel crystal powder (nickel powder), but it has been confirmed that a sufficient effect of suppressing growth of the nickel hydroxide component into a plate-shaped crystal cannot be obtained.

(i) Anionic Component Required for Nickel Hydroxide Basic Salt

As described above, in order for the oxide film to contain a nickel hydroxide basic salt as shown in the formula (5) as a main component, the nickel powder slurry or a diluted liquid of the slurry is to be made to contain an anionic component for formation of the basic salt. The chemical agent that is used as necessary in order to make the nickel powder slurry or a diluted liquid of the slurry contain such an anionic component is preferably easily soluble in water. Specifically, inorganic acids can be used such as hydrochloric acid (HCl), nitric acid (HNO$_3$), sulfuric acid (H$_2$SO$_4$), carbonic acid (H$_2$CO$_3$), formic acid (HCOOH), and acetic acid (CH$_3$COOH), and inorganic acid salts can be used such as a lithium (Li) salt, a sodium (Na) salt, a potassium (K) salt, and an ammonium (NH$_4$) of hydrochloric acid (HCl), nitric acid (HNO$_3$), sulfuric acid (H$_2$SO$_4$), carbonic acid (H$_2$CO$_3$), formic acid (HCOOH), acetic acid (CH$_3$COOH), and the like. These inorganic acids and salts thereof may be used as they are, but are more preferably used in the form of an aqueous solution considering ease of handling. For example, in the case of using carbonic acid, a carbon dioxide gas (CO$_2$) may be blown into the liquid (nickel powder slurry or diluted liquid of the slurry) and made to act in the form of a carbonate ion (CO$_3^{2-}$) or hydrogen carbonate ion (HCO$_3^-$) in the liquid.

The nickel powder slurry as a post-reaction liquid in the crystallization step contains an anionic component derived from the chemical agent used in the crystallization step (such as SO$_4^{2-}$ and Cl$^-$ derived from nickel chloride (NiCl$_2$) and nickel sulfate (NiSO$_4$)), and therefore if the nickel powder slurry or a diluted liquid of the slurry already contains a sufficient amount of the anionic component, the chemical agent is unnecessary that is used to make the nickel powder slurry or a diluted liquid of the slurry contain the anionic component.

(2-2-2. Method and Procedure of Forming Oxide Film)

In the oxide film forming step, for example, to the nickel powder slurry as a post-reaction liquid in the crystallization step containing the nickel crystal powder (nickel powder) without an oxide film or to a diluted liquid of the slurry, the above-described inorganic acid or its salt is added as necessary so that the nickel hydroxide basic salt contains a necessary anionic component, then the above-described oxidizing agent is added, and the slurry is subjected to an oxide film forming treatment to form an oxide film containing the nickel hydroxide basic salt as a main component on the surface of the nickel crystal powder (nickel powder). The oxide film forming treatment may be performed on a nickel powder cake or the like by passing an oxidizing agent solution through the cake or the like, but is preferably performed on the nickel powder in a slurry state because in the case of forming an oxide film under a slurry state in which particles of the nickel crystal powder (nickel powder) are dispersed as much as possible, the bond strengthening by the oxide film at the contact portion between particles of the nickel crystal powder (nickel powder) is loosened, and agglomeration of particles of the nickel crystal powder (nickel powder) can be more suppressed.

The temperature at which the nickel powder slurry or a diluted liquid of the slurry is subjected to the oxide film forming treatment is not particularly limited, but is to be from room temperature to 90° C. (almost the maximum temperature at the end of the crystallization reaction), and is preferably from room temperature to about 50° C. considering convenience in the treatment. The amount of the oxidizing agent to be added to the nickel powder or a diluted liquid of the nickel powder (concentration of the oxidizing agent) and the oxide film forming treatment time after adding the oxidizing agent can be appropriately set according to the target oxidation amount of the oxide film (thickness of the oxide film). The amount of the oxidizing agent is, for example, in the case of the nickel powder slurry containing the nickel crystal powder (nickel powder) including particles having a particle size of about 0.2 μm, preferably 1 mol % to 20 mol %, more preferably 3 mol % to 15 mol %, and still more preferably 5 mol % to 10 mol % (in a case where the oxidizing agent is hydrogen peroxide (H$_2$O$_2$), the amount in terms of mass % is preferably 0.58 mass % to 11.6 mass %, more preferably 1.74 mass % to 8.69 mass %, and still more preferably 2.90 mass % to 5.80 mass %) with respect to nickel. The amount of the oxidizing agent required is considered to be proportional to the specific surface area of the nickel crystal powder (nickel powder) (that is, inversely proportional to the particle size), and therefore in a case where the particle size is not 0.2 μm, the oxidizing agent is to be used in an amount inversely proportional to the particle size. For example, in a case where the particle size is about 0.1 μm, the amount of the oxidizing agent is about twice as much as in a case where the particle size is about 0.2 μm, and in a case where the particle size is about 0.4 μm, the amount of the oxidizing agent is about 0.5 times of that in a case where the particle size is about 0.2 μm. The oxide film forming treatment time is preferably 1 minute to 60 minutes, more preferably 3 minutes to 30 minutes, and still more preferably 5 minutes to 15 minutes.

In the present invention, the oxide film forming treatment is basically performed on the nickel powder slurry or a diluted liquid of the slurry, for example, immediately after the crystallization step, but may be performed in the middle of the washing and filtering step at a phase in which a sufficient amount of the anionic component still remains in the nickel powder slurry washed to some extent, or may be performed with a procedure in which to the nickel powder slurry washed sufficiently in the washing and filtering step and containing almost no remaining anionic component, the chemical agent to be used to make the slurry contain the anionic component is added, and the oxide film forming treatment is performed, followed by washing.

(2-3. Washing and Filtering Step)

In the method for manufacturing a nickel powder using a wet process as described above, hydrazine is often used as a reducing agent. Therefore, as is clear from Patent Literature 4 and the like, the reaction liquid is strongly alkaline (for example, about pH 14) in general. As shown in FIG. 1, in the crystallization step, a nickel powder slurry is obtained in which a nickel crystal powder is generated in the reaction liquid through the reductive reaction of hydrazine, and a washing and filtering step and a drying step follow the crystallization step. In the washing and filtering step, the nickel crystal powder is filtered out and collected from the nickel powder slurry while washed with pure water to obtain a water-containing nickel powder cake, and in the drying step, the water-containing nickel powder cake is dried (for example, vacuum-dried) to obtain a nickel crystal powder (nickel powder).

The washing and filtering step is usually carried out in the air, and therefore oxidation of the nickel crystal powder is unavoidable because the resulting washed water-containing nickel powder cake is more or less exposed to the air during the washing and filtering step and before the drying in the drying step. In particular in a case where the crystallization reaction is carried out on a mass production scale, it takes time to handle the water-containing nickel powder cake unlike in the case of handling a small amount of cake at the laboratory level, and therefore the oxidation of the nickel crystal powder due to exposure to the air is likely to proceed.

In the water-containing nickel powder cake obtained through the washing and filtering step of filtering and collecting from the nickel powder slurry (having, for example, a pH of about 14) during washing with pure water, although impurities (such as Na and Cl) in the post-reaction liquid containing an alkali hydroxide is washed and removed, a small amount of the alkali hydroxide may remain as a weakly alkaline adhering liquid (having, for example, a pH of about 11) in the water-containing nickel powder cake. Therefore, if the nickel crystal powder is oxidized in this state, the nickel ion ($Ni^{2+}$) generated through the oxidation is likely to form nickel hydroxide by the reaction shown in the formula (6). Nickel hydroxide generated through this oxidation grows into a plate-shaped crystal, and as a result, in a place where a large amount of nickel hydroxide is formed, a coarse particle 10 (coarse particle containing plate-shaped nickel hydroxide as a main component) (having a particle size of 0.8 μm or more in many cases, see FIGS. 2, 4, 5, and 6) is likely to be generated in which particles of a nickel crystal powder 1 (having a particle size of 0.4 μm or less) are firmly connected to each other via nickel hydroxide 2 that has grown into a plate-shaped crystal.

[Chem. 6]

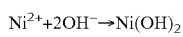

$$Ni^{2+}+2OH^-\rightarrow Ni(OH)_2 \quad (7)$$

Therefore, in the present invention, in the oxide film forming step prior to the washing and filtering step, an oxide film containing a nickel hydroxide basic salt as a main component is formed using an oxidizing agent on the surface of the nickel crystal powder (nickel powder), and thus growth of the nickel hydroxide component into a plate-shaped crystal is suppressed to prevent generation of the above-described coarse particle containing plate-shaped nickel hydroxide as a main component (coarse particle in which particles of the nickel crystal powder are firmly connected to each other via plate-shaped nickel hydroxide) even if an oxide film containing nickel hydroxide as a main component is formed.

Here, the degree of washing in the washing and filtering step is such that the nickel crystal powder is washed with pure water so that a liquid containing the nickel crystal powder has a conductivity of 30 μS/cm to 1,000 μS/cm, preferably 30 μS/cm to 500 μS/cm, and more preferably 30 μS/cm to 100 μS/cm (washing phase), and then the nickel crystal powder is filtered out from the liquid to obtain a water-containing nickel powder cake containing an adhering liquid (filtering phase), and thus the amount of remaining impurities (such as Na and Cl) generated from the chemical agent used in the crystallization step is significantly reduced.

(2-3-1. Method and Procedure of Washing and Filtering)

Figure 7:
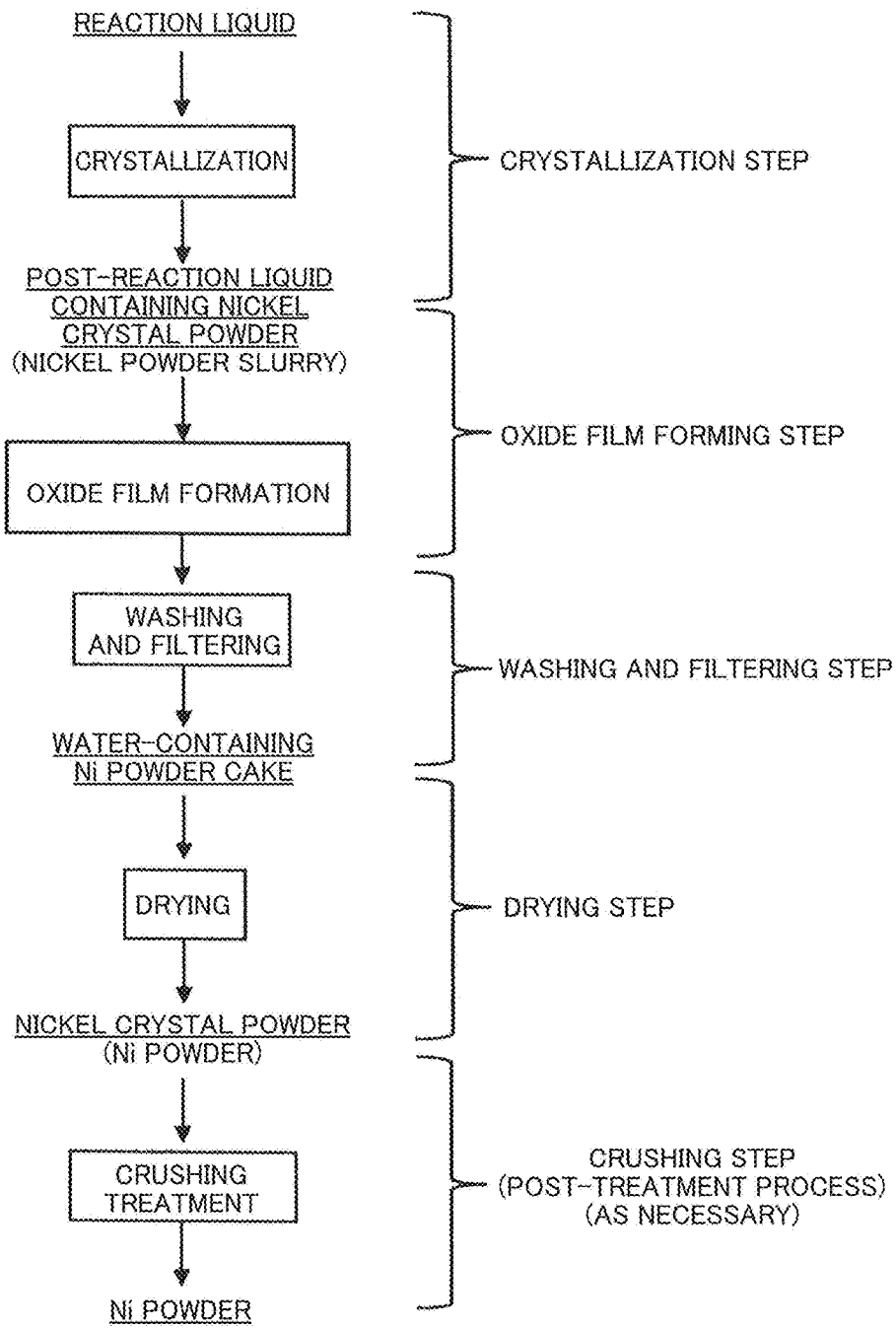
FIG. 7 is a schematic flowchart showing an example of a manufacturing process in a method for manufacturing a nickel powder of the present invention.

In the present invention, as shown in FIG. 7, in the nickel powder slurry containing the nickel crystal powder (nickel powder) including the oxide film containing a nickel hydroxide basic salt as a main component obtained in the oxide film forming step or in the diluted liquid of the slurry, while the nickel crystal powder is washed using a general-purpose washing method, the nickel crystal powder is filtered out and collected as a water-containing nickel powder cake containing an adhering liquid from the nickel powder slurry or the diluted liquid of the slurry using a general-purpose solid-liquid separator.

Specific examples of the general-purpose washing method include repeat of decantation and dilution with pure water, repeat of concentration of the nickel crystal powder with a solid-liquid separator (making the slurry have a high concentration or making the slurry into a cake) and repulping with pure water (adding pure water to make a slurry again), and washing by passing pure water through the concentrate (cake) of the nickel crystal powder in the solid-liquid separator, but are not limited thereto. Specific examples of the general-purpose solid-liquid separator include a Denver filter, a filter press, a centrifugal separator, and a decanter, but are not limited thereto.

The pure water used for the washing generally preferably has a conductivity of 1 μS/cm or less and a high purity. Distilled water or ultrapure water (conductivity: ≤0.06

μS/cm) also can be used instead of pure water, but pure water, which is inexpensive and easily available, is preferably used.

(2-4. Drying Step)

The water-containing nickel powder cake obtained in the washing and filtering step and containing the adhering liquid of the nickel crystal powder (nickel powder) having a surface on which the oxide film containing a nickel hydroxide basic salt as a main component is formed is dried at 50 to 300° C., and preferably 80 to 150° C. using a general-purpose dryer such as an air dryer, a hot air dryer, an inert gas atmosphere dryer, or a vacuum dryer to obtain the nickel crystal powder (nickel powder) having a surface on which the oxide film containing a nickel hydroxide basic salt as a main component is formed. If necessary, the adhering water in the water-containing nickel powder cake is replaced with a low-temperature volatile organic solvent such as ethanol, and then the resulting cake is dried with a dryer as described above such as an inert gas atmosphere dryer or a vacuum dryer, and thus the drying and agglomeration of the nickel particles caused by a large surface tension of water during the drying can be also weakened.

In the case of drying the water-containing nickel powder cake at about 200° C. to 300° C. using a dryer such as an inert gas atmosphere dryer or a vacuum dryer in an inert atmosphere, a reducing atmosphere, or a vacuum atmosphere, a nickel powder can be obtained that has been not only dried but also heat-treated.

(2-5. Disintegrating Step (Post-Treatment Step))

In the nickel crystal powder (nickel powder) obtained through the crystallization step, the oxide film forming step, the washing and filtering step, and the drying step and having a surface on which the oxide film containing a nickel hydroxide basic salt as a main component is formed, as described above, the amine compound and the sulfur-containing compound act as a connection inhibitor between nickel particles in the crystallization of nickel in a case where the compounds are added as necessary. Therefore, the content ratio of the coarse particle formed by connection between nickel particles in the process of reduction and precipitation (hereinafter, also referred to as "connected coarse particle" in order to distinguish it from the "coarse particle containing plate-shaped nickel hydroxide as a main component") is not so large from the first. However, according to the crystallization procedure and the crystallization condition, the content ratio of the connected coarse particle may be somewhat large, and a problem may be caused. In this case, a disintegrating step is provided during or at the end of the manufacturing process to divide, at the connecting portion, the connected coarse particle in which nickel particles are connected, and thus the connected coarse particles can be reduced. In the disintegrating treatment process, dry disintegrating methods such as spiral jet disintegrating treatment and counter jet mill disintegrating treatment, wet disintegrating methods such as high-pressure fluid collision disintegrating treatment, and other general-purpose disintegrating methods can be applied.

The above-described coarse particle including particles of the nickel crystal powder (having a particle size of 0.4 μm or less) firmly connected to each other via plate-shaped nickel hydroxide and containing plate-shaped nickel hydroxide as a main component cannot be easily disintegrated even if the above-described various general-purpose disintegrating methods are used (see FIG. 6). Therefore, effective measures to suppress coarse particles containing plate-shaped nickel hydroxide as a main component are very important, and the present invention is extremely useful also from this point of view.

The method for manufacturing the nickel powder of the present invention includes the oxide film forming step, the washing and filtering step, and the drying step, and the above-described other steps can be arbitrarily performed. In the method for manufacturing the nickel powder of the present invention, a mixture of a nickel powder slurry in which a nickel powder without an oxide film is dispersed and one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) may be prepared by producing the mixture by yourself, or may be prepared by obtaining the mixture already produced.

The method of forming an oxide film of the nickel powder of the present invention includes the oxide film forming step among the above-described steps in the method for manufacturing the nickel powder of the present invention, and the above-described other steps can be arbitrarily performed. Also in the method of forming an oxide film of the nickel powder of the present invention, a mixture of a nickel powder slurry in which a nickel powder without an oxide film is dispersed and one or more selected from at least a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) may be prepared by producing the mixture by yourself, or may be prepared by obtaining the mixture already produced.

EXAMPLE

Hereinafter, the present invention will be described more specifically with reference to Examples, but the present invention is not limited to Examples described below. As the characteristics of the nickel powder, the average particle size, the specific surface area, the content of coarse particles, and the binder resin decomposition peak temperature are evaluated as follows.

(Average Particle Size)

The nickel powder obtained in the present invention includes particles having a substantially spherical shape, and the average particle size of the particles is the number average particle size based on the particle size determined from the result of analysis of the observation image (SEM image) of the nickel powder using a scanning electron microscope (SEM, manufactured by JEOL Ltd., JSM-7100F).

(Specific Surface Area)

The specific surface area of the nickel powder was measured using "Macsorb" manufactured by Mountech Co., Ltd.

(Evaluation of Suppressing Formation of Coarse Particles Containing Plate-Shaped Nickel Hydroxide as Main Component)

It was evaluated, with the following acceleration test, whether suppression of formation of coarse particles containing plate-shaped nickel hydroxide as a main component was achieved. In the acceleration test, the water-containing nickel powder cake (water content: 25 to 35 mass %) obtained in Examples and Comparative Examples immediately before the drying step was put in an air-filled stainless steel airtight container and kept at 40° C. for 1 hour, and thus formation of coarse particles containing plate-shaped nickel hydroxide as a main component was promoted. A container containing pure water is also put in the stainless steel airtight container, and thus the inside of the stainless steel airtight container is set to be an air atmosphere saturated with water vapor at 40° C. Therefore, in the nickel crystal powder in the water-containing nickel powder cake, formation of an oxide film containing nickel hydroxide and growth of the nickel hydroxide component into a plate-shaped crystal are significantly accelerated, so that coarse particles containing plate-shaped nickel hydroxide as a main component are easily formed.

In 100 mL of a 0.1 mass % sodium hexametaphosphate aqueous solution, 0.05 g of the water-containing nickel powder cake after the acceleration test was ultrasonically dispersed to obtain a nickel powder dispersion, this dispersion was filtered through a membrane filter having a pore size of 3 µm to collect coarse particles having a size larger than the pore size of the membrane filter (a size of more than 3 µm) on the filter, and the state of the oxide film in the coarse particles was observed from the SEM image of the coarse particles collected on the membrane filter (at a magnification of 5,000 times) and evaluated. In Table 1 showing the results, the coarse particles in which particles of the nickel crystal powder were agglomerated in the SEM image are evaluated as follows. If the area rate of the coarse particles containing plate-shaped nickel hydroxide that has grown into a crystal as a main component is 50% or more, the evaluation result is "x", if the area rate is 10% or more and less than 50%, the evaluation result is "Δ", and if the area rate is less than 10%, the evaluation result is "0".

(Evaluation of Content of Coarse Particles Containing Plate-Shaped Nickel Hydroxide as Main Component)

In 100 mL of a 0.1 mass % sodium hexametaphosphate aqueous solution, 0.05 g of the nickel powder obtained in Examples and Comparative Examples was ultrasonically dispersed to obtain a nickel powder dispersion. This dispersion was filtered through a porous track-etch membrane filter having linear pores having a uniform size of 0.8 µm or 1.2 µm to collect coarse particles having a size larger than the pore size of each membrane filter (a size of more than 0.8 µm or a size of more than 1.2 µm) on the filter, the total coarse particles were dissolved in an acid to obtain a solution, the solution was analyzed with an ICP emission spectrometric analysis method (high-frequency inductively coupled plasma emission spectrometric analysis method) to calculate the amount of the coarse particles, and the content of the coarse particles contained in the nickel powder (in the case of a particle size of more than 0.8 µm and in the case of a particle size of more than 1.2 µm) was determined.

The porous track-etch membrane filter is obtained by irradiating a plastic film with a neutron beam, a heavy ion beam, or the like to form linear tracks (irradiation traces) in the film, and then wet-chemically etching (treating, with an alkaline aqueous solution) the damaged track portion to form linear pores having a uniform size on the entire surface of the film. The porous track-etch membrane filter has a feature of collecting only coarse particles larger than the pore size completely on the filter surface. The size of the pores (pore size) is controlled by the wet chemical etching treatment time and the like.

Figure 2:
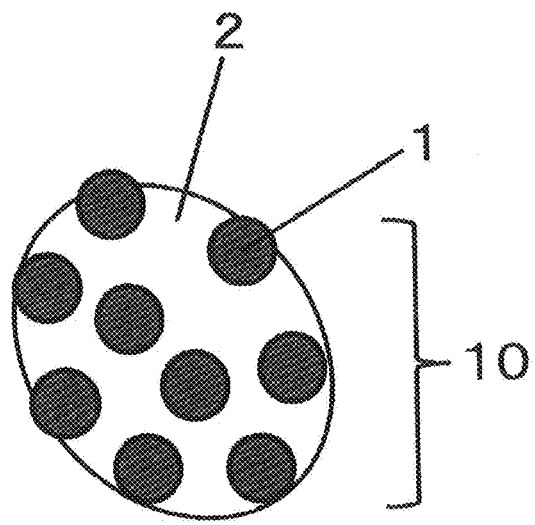
FIG. 2 is a schematic view showing a coarse particle containing plate-shaped nickel hydroxide as a main component and found in a nickel powder obtained by a wet process.

In principle in the above-described evaluation method, the coarse particles include all of (1) coarse nickel particles having a particle size of more than 0.8 µm or a particle size of more than 1.2 µm singly, (2) connected coarse particles having a size of more than 0.8 µm or a size of more than 1.2 µm in which nickel particles (of a nickel crystal powder) having a particle size of 0.4 µm or less are connected to each other on the surface of the nickel particles in the crystallization step (process of reduction and precipitation), and (3) coarse particles containing plate-shaped nickel hydroxide as a main component and having a size of more than 0.8 µm or a size of more than 1.2 µm in which nickel particles (of a nickel crystal powder) having a particle size of 0.4 µm or less are firmly connected via plate-shaped nickel hydroxide generated through oxidation (see FIG. 2).

However, in Examples, the nickel powder manufactured by the wet process in which a nickel powder having narrow particle size distribution can be obtained as described above was used. Therefore, coarse nickel particles having a particle size of more than 0.8 µm or a particle size of more than 1.2 µm singly are not generated (<10 ppm), and the presence of the particles described in (1) above can be ignored. Furthermore, the content of connected coarse particles generated by connection between nickel particles (of a nickel crystal powder) having a particle size of 0.4 µm or less on the surface of the nickel particles in the crystallization step (process of reduction and precipitation) is not so large from the first under an appropriate crystallization condition, and the strength of the connection between nickel particles is not so large. Therefore, even if the content ratio of connected coarse particles is somewhat large, connected coarse particles subjected to disintegrating treatment at the end of the manufacturing process as described above can be divided at the connecting portion to have a size of 0.8 µm or less, and thus the connected coarse particles can be eliminated (<10 ppm), so that the presence of the particles described in (2) above also can be ignored. Therefore, the coarse particles whose amount is calculated with an ICP emission spectrometric analysis method are only the particles described in (3) above, and the content of coarse particles having a particle size of more than 0.8 µm (or a particle size of more than 1.2 µm) in the present invention may be considered to be the content of coarse particles having a particle size of more than 0.8 µm (or a particle size of more than 1.2 µm) and containing plate-shaped nickel hydroxide as a main component. The reason is as follows. The coarse particles containing plate-shaped nickel hydroxide as a main component and having a size of more than 0.8 µm or a size of more than 1.2 µm are coarse particle in which a plurality of nickel particles (of a nickel crystal powder) are incorporated with nickel hydroxide generated on the surface of the nickel crystal powder and bind firmly, and therefore the coarse particles are not disintegrated even if subjected to the above-described disintegrating treatment (see FIG. 6) and remain as coarse particles having the original size in the nickel powder.

(Coarse Particles Containing Plate-Shaped Nickel Hydroxide as Main Component)

As shown in FIGS. 2, 4, 5, and 6, the coarse particles having a size of more than 0.8 µm or a size of more than 1.2 µm and collected on the membrane filter as described above have a structure in which a plurality of nickel particles (of a nickel crystal powder) incorporated into a matrix of nickel hydroxide grown into a plate-shaped crystal are firmly connected via the plate-shaped nickel hydroxide matrix (in the coarse particle containing plate-shaped nickel hydroxide as a main component in FIG. 6, the surface of the nickel hydroxide matrix only appears smooth due to the action of the particle collision energy in the disintegrating treatment). The fact that the matrix (the portion with reference sign 2 in FIG. 2) contains nickel hydroxide as a main component is confirmed from the following measurement results (a) and (b) in the coarse particles having a size of more than 0.8 µm or a size of more than 1.2 µm and collected on the membrane filter. (a) In the measurement of the matrix portion with SEM-EDS, many places are observed in which the molar ratio of nickel to oxygen is about Ni:O=1:2. (b) In the measurement result, with XPS, of coarse particles having a size of more than 0.8 μm or a size of more than 1.2 μm and collected from the membrane filter, nickel hydroxide is detected as a main component.

Furthermore, the fact that the oxide film formed on the surface of the nickel crystal powder (nickel powder) of the present invention is a nickel hydroxide basic salt is confirmed from increase in the content of the element (such as S, Cl, N, or C) included in the anion (such as $SO_4^{2-}$, $Cl^-$, $NO_3^-$, $CO_3^{2-}$, $HCO_3^-$, $HCO_2^-$, or $CH_3CO_2$) contained in the nickel crystal powder (nickel powder) through the oxide film forming treatment and the like, that is, uptake of the anion into the oxide film, and from the above-described measurement result with XPS.

(Measurement of Content of Constituent Element Other than Nickel in Nickel Powder)

The oxygen content and the nitrogen content were measured with an oxygen/nitrogen analyzer (ON836 manufactured by LECO), the carbon content and the sulfur content were measured with a carbon/sulfur analyzer (CS844 manufactured by LECO), the sodium content was measured with a frame atomic absorption spectrophotometer (ZA3300 manufactured by Hitachi High-Tech Science Corporation), and the chlorine content was measured with a fluorescent X-ray analyzer (ZSX Primus IV manufactured by Rigaku Corporation).

(Evaluation of Suppressing Binder Resin Decomposition)

As described above, if the surface of the nickel powder has high catalytic activity, in binder removing treatment at the time of manufacturing a multilayer ceramic capacitor, the binder resin is rapidly decomposed to generate a large amount of decomposition gas, and thus a crack is likely to occur in the laminate in some cases. Therefore, one of the methods of suppressing binder resin decomposition is a method of reducing the catalytic activity of the nickel powder by surface treatment (sulfur coating treatment) in which sulfur is adhered to the nickel powder.

In the evaluation of suppressing binder resin decomposition in the present invention, a mixed powder of 20 parts by weight of the nickel powder and 1 part by weight of an ethyl cellulose (EC) resin powder is heated in a nitrogen atmosphere at a heating rate of 10° C./min to perform thermogravimetry (TG), and in the profile of the amount of weight change with respect to temperature (ΔTG) as the resin decomposition behavior, the temperature at which the minimum value was shown was determined as the resin decomposition peak temperature (Tn). In a similar way, the resin decomposition peak temperature of the single ethyl cellulose (EC) resin powder (Tr) was determined, and the difference (Tr–Tn) was used as an index of suppressing resin decomposition. If (Tr–Tn) was more than 20° C., the evaluation result was determined to be "x", if (Tr–Tn) was more than 10° C. and 20° C. or less, the evaluation result was determined to be "Δ", and if (Tr–Tn) was 10° C. or less, the evaluation result was determined to be "○". The resin decomposition peak temperature (Tr) of the single ethyl cellulose resin powder measured under the above-described conditions was 340° C.

Example 1

[Preparation of Solution of Nickel Salt and Salt of Metal Nobler Than Nickel]

In 1,880 mL of pure water, 405 g of nickel chloride hexahydrate ($NiCl_2 \cdot 6H_2O$, molecular weight: 237.69) as a nickel salt, 1.271 g of L-methionine ($CH_3SC_2H_4CH(NH_2)COOH$, molecular weight: 149.21), which includes one sulfide group (—S—) in the molecule, as a sulfur-containing compound as a self-decomposition suppressing auxiliary agent for hydrazine, and 0.134 mg of palladium (II) ammonium chloride (another name: ammonium tetrachloropalladate (II)) (($NH_4)_2PdCl_4$, molecular weight: 284.31) as a salt of a metal nobler than nickel were dissolved to prepare a nickel salt solution as an aqueous solution containing a nickel salt as a main component, a sulfur-containing compound, and a nucleating agent that is a metal salt of a metal nobler than nickel. Here, in the nickel salt solution, L-methionine, which is a sulfide compound, is contained at a content as small as 0.5 mol % (molar ratio of 0.005) with respect to nickel, and palladium is contained at a content of 0.28 mol ppm (0.50 mass ppm) with respect to nickel.

[Preparation of Reducing Agent Solution]

As a reducing agent, 207 g of commercially available industrial grade 60 mass % hydrous hydrazine (manufactured by Otsuka-MGC Chemical Company, Inc.), which is obtained by diluting hydrous hydrazine ($N_2H_4/H_2O$, molecular weight: 50.06) to 1.67 times with pure water, was weighed, and a reducing agent solution was prepared that was an aqueous solution containing hydrazine as a main component without containing an alkali oxide. The molar ratio of hydrazine contained in the reducing agent solution to nickel in the nickel salt solution is 1.46.

[Alkali Hydroxide Solution]

In 672 mL of pure water, 230 g of sodium hydroxide (NaOH, molecular weight: 40.0) as an alkali hydroxide was dissolved to prepare an alkali hydroxide solution as an aqueous solution containing sodium hydroxide as a main component. The sodium hydroxide contained in the alkali hydroxide solution was prepared so that the molar ratio to nickel in the nickel salt solution was 5.75.

[Amine Compound Solution]

In 19 mL of pure water, 1.024 g of ethylenediamine (abbreviation: EDA) ($H_2NC_2H_4NH_2$, molecular weight: 60.1), which is an alkyleneamine including two primary amino groups (—$NH_2$) in the molecule, as an amine compound that serves as a self-decomposition inhibitor for hydrazine and serves as a reductive reaction accelerator (complexing agent) was dissolved to prepare an amine compound solution as an aqueous solution containing ethylenediamine as a main component. The content of ethylenediamine in the amine compound solution was as small as 1.0 mol % (that is, the molar ratio was 0.01) with respect to nickel in the nickel salt solution. Note that reagents manufactured by Wako Pure Chemical Industries, Ltd. were used as the materials excluding 60 mass % hydrous hydrazine that were used in the nickel salt solution, the reducing agent solution, the alkali hydroxide solution, and the amine compound solution.

[Crystallization Step]

The nickel salt solution in which nickel chloride and the palladium salt were dissolved in pure water was put in a Teflon (registered trademark)-coated stainless steel container with a stirring blade and heated while stirred so that the liquid temperature was 85° C., and then the reducing agent solution containing hydrazine and water and having a liquid temperature of 25° C. was added and mixed over a mixing time of 20 seconds to prepare a nickel salt/reducing agent-containing liquid. To this nickel salt/reducing agent-containing liquid, the alkali hydroxide solution containing alkali hydroxide and water and having a liquid temperature of 25° C. was added and mixed over a mixing time of 80 seconds to prepare a reaction liquid (nickel chloride+palladium salt+hydrazine+sodium hydroxide) having a liquid temperature of 70° C., and a reductive reaction (crystallization reaction) was started. The reaction start temperature was 63° C. From 8 minutes to 18 minutes after the start of the reaction, the amine compound solution was dripped and mixed into the reaction liquid over 10 minutes to promote the reductive reaction while self-decomposition of hydrazine was suppressed, and thus a nickel crystal powder was crystallized in the reaction liquid. It was confirmed that the reductive reaction shown in the above-described formula (3) was completed within 60 minutes from the start of the reaction, the supernatant of the reaction liquid was transparent, and the whole nickel component in the reaction liquid was reduced to metallic nickel.

In 207 g of 60 mass % hydrous hydrazine blended in the reducing agent solution, the amount of 60 mass % hydrous hydrazine consumed in the crystallization reaction was 171 g, and the molar ratio of hydrazine consumed in the crystallization reaction to nickel was 1.20. Here, the molar ratio of hydrazine consumed in the reductive reaction to nickel is assumed to be 0.5 from the above-described formula (3), and therefore it is estimated that the molar ratio of hydrazine consumed in self-decomposition to nickel was 0.70.

[Oxide Film Forming Step]

In the crystallization step, a strongly alkaline (pH: 14.1) nickel powder slurry was obtained in a slurry state as a post-reaction liquid containing the nickel crystal powder. About 50% of the supernatant of this nickel powder slurry was removed (decanted), and pure water having a conductivity of 1 μS/cm was added in about the same amount as the removed supernatant to dilute the nickel powder slurry (pH: 13.8). To the diluted nickel powder slurry, an aqueous solution of mercaptoacetic acid (thioglycolic acid) ($HSCH_2COOH$, molecular weight: 92.12) as a sulfur coating agent was added to perform surface treatment (sulfur coating treatment) on the nickel crystal powder. Then, the nickel powder slurry was left to stand to settle the surface-treated nickel crystal powder, the supernatant was removed (decanted) in an amount of about 65% of the reaction liquid, and pure water having a conductivity of 1 μS/cm was added in about the same amount as the removed supernatant to dilute the nickel powder slurry (the main anion in the liquid was $Cl^-$: 0.21 mol/L). Then, sulfuric acid ($H_2SO_4$) as a chemical agent used to make the slurry contain an anionic component was added so as to be 0.5 mol % with respect to nickel, pure water was further added to adjust the total amount of the slurry to 1 L, and the pH of the liquid was set to about 8.0 (the main anions in the liquid were $Cl^-$: 0.20 mol/L and $SO_4^{2-}$: 0.05 mol/L). This liquid was kept at room temperature (25° C.), 17.7 g of a 30 mass % hydrogen peroxide solution (9.2 mol % (5.3 mass %) of hydrogen peroxide with respect to nickel) as an oxidizing agent was added while the liquid was stirred, the resulting liquid was left to stand for 10 minutes to perform oxide film forming treatment, and thus an oxide film containing a nickel hydroxide basic salt as a main component was formed on the surface of the nickel crystal powder.

[Washing and Filtering Step]

The above-described pure water was used for the slurry obtained in the oxide film forming step and containing the nickel crystal powder having a surface on which the oxide film containing a nickel hydroxide basic salt as a main component was formed, and the nickel crystal powder having a surface on which the oxide film containing a nickel hydroxide basic salt as a main component was formed was suction-filtered and washed (washed by passing water during suction-filtration with pure water) using a Buechner funnel (filter paper: 5C) until the conductivity of the filtrate from the filtered slurry reached 50 μS/cm, and after the washing, suction was continued in the air for 20 minutes to obtain a water-containing nickel powder cake (usually having a water content of about 25 to 35 mass %) in which the solid and the liquid separate. Table 1 shows the oxidizing agent used for oxide film forming treatment and the main anions in the nickel powder slurry. (Similarly, Tables 1 and 2 show the oxidizing agent and the main anions in the nickel powder slurry in Examples 2 to 11 and Comparative Examples 1 to 5 described below.)

[Drying Step]

The water-containing nickel powder cake was vacuum-dried in a vacuum dryer set at a temperature of 150° C. to obtain a nickel crystal powder (nickel powder).

[Disintegrating Step (Post-Treatment Step)]

The crystallization step, the washing and filtering step, and the drying step were followed by the disintegrating step carried out to reduce the coarse particles formed mainly by connection between nickel particles in the nickel powder. Specifically, the nickel crystal powder (nickel powder) obtained in the crystallization step was subjected to spiral jet disintegrating treatment, which is a dry disintegrating method. Through the above-described steps, the nickel powder according to Example 1 produced by the wet process was obtained.

(Physical Properties of Nickel Powder)

The obtained nickel powder had an average particle size of 0.20 μm, and had an oxygen content of 0.42 mass %·g/m² and a sulfur content of 0.060 mass %·g/m² with respect to the specific surface area (m²/g) of the nickel powder. The content of the coarse particles having a particle size of more than 0.8 μm and containing plate-shaped nickel hydroxide as a main component was 30 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr−Tn) was 0° C. Table 1 shows the content of the coarse particles having a particle size of more than 0.8 μm and containing plate-shaped nickel hydroxide as a main component, and the content of the coarse particles having a particle size of more than 1.2 μm and containing plate-shaped nickel hydroxide as a main component. Similarly, Tables 1 and 2 show the content of the coarse particles in Examples 2 to 11 and Comparative Examples 1 to 5 described below.

Example 2

A nickel crystal powder (nickel powder) was obtained in the same manner as in Example 1 except that surface treatment (sulfur coating treatment) was not performed on the nickel crystal powder in the diluted nickel powder slurry obtained by removing (decanting) the supernatant of the nickel powder slurry obtained in the crystallization step and adding pure water. Then, the nickel crystal powder (nickel powder) was subjected to spiral jet disintegrating treatment in the same manner as in Example 1. Through the above-described steps, the nickel powder according to Example 2 produced by the wet process was obtained.

(Physical Properties of Nickel Powder)

The obtained nickel powder had an average particle size of 0.20 μm, and had an oxygen content of 0.42 mass %·g/m² and a sulfur content of 0.028 mass %·g/m² with respect to the specific surface area (m²/g) of the nickel powder. The content of the coarse particles having a particle size of more than 0.8 μm and containing plate-shaped nickel hydroxide as a main component was 20 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr−Tn) was 0° C.

Example 3

In the oxide film forming step, oxide film forming treatment was carried out with a hydrogen peroxide solution as an oxidizing agent without using a sulfuric acid ($H_2SO_4$) aqueous solution as a chemical agent used to make the slurry contain an anionic component. A nickel crystal powder (nickel powder) was obtained in the same manner as in Example 1 except that after the surface treatment (sulfur coating treatment) of the nickel crystal powder, 24.9 g of 30 mass % hydrogen peroxide solution (12.9 mol % (7.5 mass %) of hydrogen peroxide with respect to nickel) was added to the slurry in Example 1 in a state of being decanted and diluted with pure water (the main anion in the liquid was $Cl^-$: 0.21 mol/L), and the resulting slurry was left to stand for 5 minutes to form an oxide film. Then, the nickel crystal powder (nickel powder) was subjected to spiral jet disintegrating treatment in the same manner as in Example 1. Through the above-described steps, the nickel powder according to Example 3 produced by the wet process was obtained.

(Physical Properties of Nickel Powder)

The obtained nickel powder had an average particle size of 0.20 μm, and had an oxygen content of 0.42 mass %·g/m$^2$ and a sulfur content of 0.051 mass %·g/m$^2$ with respect to the specific surface area (m$^2$/g) of the nickel powder. The content of the coarse particles having a particle size of more than 0.8 μm and containing plate-shaped nickel hydroxide as a main component was 40 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr−Tn) was 0° C.

Example 4

A nickel crystal powder (nickel powder) was obtained in the same manner as in Example 3 except that surface treatment (sulfur coating treatment) was not performed on the nickel crystal powder in the diluted nickel powder slurry obtained by removing (decanting) the supernatant of the nickel powder slurry obtained in the crystallization step and adding pure water. Then, the nickel crystal powder (nickel powder) was subjected to spiral jet disintegrating treatment in the same manner as in Example 1. Through the above-described steps, the nickel powder according to Example 4 produced by the wet process was obtained.

(Physical Properties of Nickel Powder)

The obtained nickel powder had an average particle size of 0.20 μm, and had an oxygen content of 0.40 mass %·g/m$^2$ and a sulfur content of 0.021 mass %·g/m$^2$ with respect to the specific surface area (m$^2$/g) of the nickel powder. The content of the coarse particles having a particle size of more than 0.8 μm and containing plate-shaped nickel hydroxide as a main component was 30 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr−Tn) was 0° C.

Example 5

A nickel crystal powder (nickel powder) was obtained in the same manner as in Example 1 except the following procedure. In the oxide film forming step, a sulfuric acid ($H_2SO_4$) aqueous solution was not used as a chemical agent used to make the slurry contain an anionic component, sodium nitrate ($NaNO_3$) as a chemical agent used to make the slurry contain an anionic component was added in an amount of 0.5 mol % with respect to nickel to the slurry washed until the conductivity of the liquid reached 50 μS/cm (almost no anionic component was contained), pure water was further added to adjust the total amount of the slurry to 1 L, the pH of the liquid was set to about 7 (the main anion in the liquid was $NO_3^-$: 0.0043 mol/L), 7.1 g of a 30 mass % hydrogen peroxide solution (3.7 mol % (2.1 mass %) of hydrogen peroxide with respect to nickel) was added to the slurry, the resulting slurry was left to stand for 30 minutes to perform oxide film forming treatment, then subjected to solid-liquid separation, and washed by passing water to remove the excessive oxidizing agent and the excessive chemical agent used to make the slurry contain an anionic component, and thus a water-containing nickel powder cake was obtained. Then, the nickel crystal powder (nickel powder) was subjected to spiral jet disintegrating treatment in the same manner as in Example 1. Through the above-described steps, the nickel powder according to Example 5 produced by the wet process was obtained.

(Physical Properties of Nickel Powder)

The obtained nickel powder had an average particle size of 0.20 μm, and had an oxygen content of 0.42 mass %·g/m$^2$ and a sulfur content of 0.049 mass %·g/m$^2$ with respect to the specific surface area (m$^2$/g) of the nickel powder. The content of the coarse particles having a particle size of more than 0.8 μm and containing plate-shaped nickel hydroxide as a main component was 50 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr−Tn) was 0° C.

Example 6

A nickel crystal powder (nickel powder) was obtained in the same manner as in Example 5 except that surface treatment (sulfur coating treatment) was not performed on the nickel crystal powder in the diluted nickel powder slurry obtained by removing (decanting) the supernatant of the nickel powder slurry obtained in the crystallization step and adding pure water. Then, the nickel crystal powder (nickel powder) was subjected to spiral jet disintegrating treatment in the same manner as in Example 1. Through the above-described steps, the nickel powder according to Example 6 produced by the wet process was obtained.

(Physical Properties of Nickel Powder)

The obtained nickel powder had an average particle size of 0.20 μm, and had an oxygen content of 0.40 mass %·g/m$^2$ and a sulfur content of 0.021 mass %·g/m$^2$ with respect to the specific surface area (m$^2$/g) of the nickel powder. The content of the coarse particles having a particle size of more than 0.8 μm and containing plate-shaped nickel hydroxide as a main component was 40 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr−Tn) was 0° C.

Example 7

A nickel crystal powder (nickel powder) was obtained in the same manner as in Example 1 except the following procedure. In the oxide film forming step, a sulfuric acid ($H_2SO_4$) aqueous solution was not used as a chemical agent used to make the slurry contain an anionic component, sodium carbonate ($Na_2CO_3$) as a chemical agent used to make the slurry contain an anionic component was added in an amount of 0.5 mol % with respect to nickel to the slurry washed until the conductivity of the liquid reached 50 μS/cm (almost no anionic component was contained), pure water was further added to adjust the total amount of the slurry to 1 L, the pH of the liquid was set to about 11 (the main anion in the liquid was $CO_3^{2-}$: 0.0043 mol/L), 10.7 g of a 30 mass % hydrogen peroxide solution (5.5 mol % (3.2 mass %) of hydrogen peroxide with respect to nickel) was added to the slurry, the resulting slurry was left to stand for 15 minutes to perform oxide film forming treatment, then subjected to solid-liquid separation, and washed by passing water to remove the excessive oxidizing agent and the excessive chemical agent used to make the slurry contain an anionic component, and thus a water-containing nickel powder cake was obtained. Then, the nickel crystal powder (nickel powder) was subjected to spiral jet disintegrating treatment in the same manner as in Example 1. Through the above-described steps, the nickel powder according to Example 7 produced by the wet process was obtained.

(Physical Properties of Nickel Powder)

The obtained nickel powder had an average particle size of 0.20 μm, and had an oxygen content of 0.42 mass %·g/m² and a sulfur content of 0.051 mass %·g/m² with respect to the specific surface area (m²/g) of the nickel powder. The content of the coarse particles having a particle size of more than 0.8 μm and containing plate-shaped nickel hydroxide as a main component was 40 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr−Tn) was 0° C.

Example 8

A nickel crystal powder (nickel powder) was obtained in the same manner as in Example 7 except that surface treatment (sulfur coating treatment) was not performed on the nickel crystal powder in the diluted nickel powder slurry obtained by removing (decanting) the supernatant of the nickel powder slurry obtained in the crystallization step and adding pure water. Then, the nickel crystal powder (nickel powder) was subjected to spiral jet disintegrating treatment in the same manner as in Example 1. Through the above-described steps, the nickel powder according to Example 8 produced by the wet process was obtained.

(Physical Properties of Nickel Powder)

The obtained nickel powder had an average particle size of 0.20 μm, and had an oxygen content of 0.40 mass %·g/m² and a sulfur content of 0.021 mass %·g/m² with respect to the specific surface area (m²/g) of the nickel powder. The content of the coarse particles having a particle size of more than 0.8 μm and containing plate-shaped nickel hydroxide as a main component was 30 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr−Tn) was 0° C.

Example 9

A nickel crystal powder (nickel powder) was obtained in the same manner as in Example 1 except the following procedure. In the oxide film forming step, a sulfuric acid ($H_2SO_4$) aqueous solution was not used as a chemical agent used to make the slurry contain an anionic component, sodium formate (HCOONa) as a chemical agent used to make the slurry contain an anionic component was added in an amount of 0.5 mol % with respect to nickel to the slurry washed until the conductivity of the liquid reached 50 pS/cm (almost no anionic component was contained), pure water was further added to adjust the total amount of the slurry to 1 L, the pH of the liquid was set to about 9 (the main anion in the liquid was $HCOO^-$: 0.0043 mol/L), 35.6 g of a 30 mass % hydrogen peroxide solution (18.4 mol % (10.7 mass %) of hydrogen peroxide with respect to nickel) was added to the slurry, the resulting slurry was left to stand for 3 minutes to perform oxide film forming treatment, then subjected to solid-liquid separation, and washed by passing water to remove the excessive oxidizing agent and the excessive chemical agent used to make the slurry contain an anionic component, and thus a water-containing nickel powder cake was obtained. Then, the nickel crystal powder (nickel powder) was subjected to spiral jet disintegrating treatment in the same manner as in Example 1. Through the above-described steps, the nickel powder according to Example 9 produced by the wet process was obtained.

(Physical Properties of Nickel Powder)

The obtained nickel powder had an average particle size of 0.20 μm, and had an oxygen content of 0.37 mass %·g/m² and a sulfur content of 0.049 mass %·g/m² with respect to the specific surface area (m²/g) of the nickel powder. The content of the coarse particles having a particle size of more than 0.8 μm and containing plate-shaped nickel hydroxide as a main component was 40 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr−Tn) was 0° C.

Example 10

A nickel crystal powder (nickel powder) was obtained in the same manner as in Example 1 except the following procedure. In the oxide film forming step, a sulfuric acid ($H_2SO_4$) aqueous solution was not used as a chemical agent used to make the slurry contain an anionic component, sodium acetate ($CH_3COONa$) as a chemical agent used to make the slurry contain an anionic component was added in an amount of 0.5 mol % with respect to nickel to the slurry washed until the conductivity of the liquid reached 50 μS/cm (almost no anionic component was contained), pure water was further added to adjust the total amount of the slurry to 1 L, the pH of the liquid was set to about 9 (the main anion in the liquid was $CH_3COO^-$: 0.0043 mol/L), the slurry was subjected to oxide film forming treatment using a hydrogen peroxide solution, then subjected to solid-liquid separation, and washed by passing water to remove the excessive oxidizing agent and the excessive chemical agent used to make the slurry contain an anionic component, and thus a water-containing nickel powder cake was obtained. Then, the nickel crystal powder (nickel powder) was subjected to spiral jet disintegrating treatment in the same manner as in Example 1. Through the above-described steps, the nickel powder according to Example 10 produced by the wet process was obtained.

(Physical Properties of Nickel Powder)

The obtained nickel powder had an average particle size of 0.20 μm, and had an oxygen content of 0.40 mass %·g/m$^2$ and a sulfur content of 0.051 mass %·g/m$^2$ with respect to the specific surface area (m$^2$/g) of the nickel powder. The content of the coarse particles having a particle size of more than 0.8 μm and containing plate-shaped nickel hydroxide as a main component was 40 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr–Tn) was 0° C.

Example 11

[Preparation of Solution of Nickel Salt and Salt of Metal Nobler Than Nickel]

In 1,880 mL of pure water, 405 g of nickel chloride hexahydrate ($NiCl_2.6H_2O$, molecular weight: 237.69) as a nickel salt, 1.271 g of L-methionine ($CH_3SC_2H_4CH(NH_2)COOH$, molecular weight: 149.21), which includes one sulfide group (—S—) in the molecule, as a sulfur-containing compound as a self-decomposition suppressing auxiliary agent for hydrazine, and 0.040 mg of palladium (II) ammonium chloride (another name: ammonium tetrachloropalladate (II)) (($NH_4)_2PdCl_4$, molecular weight: 284.31) as a salt of a metal nobler than nickel were dissolved to prepare a nickel salt solution as an aqueous solution containing a nickel salt as a main component, a sulfur-containing compound, and a nucleating agent that is a metal salt of a metal nobler than nickel. Here, in the nickel salt solution, L-methionine, which is a sulfide compound, is contained at a content as small as 0.5 mol % (molar ratio of 0.005) with respect to nickel, and palladium is contained at a content of 0.08 mol ppm (0.15 mass ppm) with respect to nickel.

A nickel crystal powder (nickel powder) was obtained in the same manner as in Example 4 except that in the crystallization step, the above-described solution of a nickel salt and a salt of a metal nobler than nickel was used, 16.6 g of a 30 mass % hydrogen peroxide solution (8.6 mol % (5.0 mass %) of hydrogen peroxide with respect to nickel) was added, and the resulting liquid was left to stand for 5 minutes to perform oxide film forming treatment. Then, the nickel crystal powder (nickel powder) was subjected to spiral jet disintegrating treatment in the same manner as in Example 1. Through the above-described steps, the nickel powder according to Example 11 produced by the wet process was obtained.

(Physical Properties of Nickel Powder)

The obtained nickel powder had an average particle size of 0.30 μm, and had an oxygen content of 0.48 mass %·g/m$^2$ and a sulfur content of 0.021 mass %·g/m$^2$ with respect to the specific surface area (m$^2$/g) of the nickel powder. The content of the coarse particles having a particle size of more than 0.8 μm and containing plate-shaped nickel hydroxide as a main component was 60 mass ppm, and the content of the coarse particles having a particle size of more than 1.2 μm and containing plate-shaped nickel hydroxide as a main component was less than 10 mass ppm. The resin decomposition peak temperature (Tn) of the nickel powder was measured and found to be 340° C. Therefore, (Tr–Tn) was 0° C.

Comparative Example 1

In the washing and filtering step, the nickel crystal powder was subjected to surface treatment (sulfur coating treatment), and then, without oxide film forming treatment, the slurry containing the surface-treated nickel crystal powder was filtered and washed using pure water having a conductivity of 1 μS/cm until the conductivity of the filtrate from the filtered slurry reached 50 μS/cm (the pH of the liquid was about 8), and solid-liquid separation was performed to obtain a water-containing nickel powder cake. In the same manner as in Example 1 except the above-described procedure, a nickel crystal powder (nickel powder) was obtained. Then, the nickel crystal powder (nickel powder) was subjected to spiral jet disintegrating treatment in the same manner as in Example 1. Through the above-described steps, the nickel powder according to Comparative Example 1 produced by the wet process was obtained.

(Physical Properties of Nickel Powder)

The obtained nickel powder had an average particle size of 0.20 μm, and had an oxygen content of 0.26 mass %·g/m$^2$ and a sulfur content of 0.052 mass %·g/m$^2$ with respect to the specific surface area (m$^2$/g) of the nickel powder. The content of the coarse particles having a particle size of more than 0.8 μm and containing plate-shaped nickel hydroxide as a main component was 310 mass ppm, and the content of the coarse particles having a particle size of more than 1.2 μm and containing plate-shaped nickel hydroxide as a main component was 150 mass ppm. The resin decomposition peak temperature (Tn) of the nickel powder was measured and found to be 340° C. Therefore, (Tr–Tn) was 0° C.

Comparative Example 2

A nickel crystal powder (nickel powder) was obtained in the same manner as in Comparative Example 1 except that surface treatment (sulfur coating treatment) was not performed on the nickel crystal powder in the diluted nickel powder slurry obtained by removing (decanting) the supernatant of the nickel powder slurry obtained in the crystallization step and adding pure water. Then, the nickel crystal powder (nickel powder) was subjected to spiral jet disintegrating treatment in the same manner as in Example 1. Through the above-described steps, the nickel powder according to Comparative Example 2 produced by the wet process was obtained.

(Physical Properties of Nickel Powder)

The obtained nickel powder had an average particle size of 0.20 μm, and had an oxygen content of 0.26 mass %·g/m$^2$ and a sulfur content of 0.021 mass %·g/m$^2$ with respect to the specific surface area (m$^2$/g) of the nickel powder. The content of the coarse particles having a particle size of more than 0.8 μm and containing plate-shaped nickel hydroxide as a main component was 250 mass ppm, and the content of the coarse particles having a particle size of more than 1.2 μm and containing plate-shaped nickel hydroxide as a main component was 120 mass ppm. The resin decomposition peak temperature (Tn) of the nickel powder was measured and found to be 310° C. Therefore, (Tr−Tn) was 30° C.

Comparative Example 3

A nickel crystal powder (nickel powder) was obtained in the same manner as in Example 1 except that a sulfuric acid ($H_2SO_4$) aqueous solution was not used as a chemical agent used to make the slurry contain an anionic component, and in the oxide film forming step, the slurry washed until the conductivity of the liquid reached 50 μS/cm (almost no anionic component was contained) was subjected to oxide film forming treatment using a hydrogen peroxide solution as an oxidizing agent, then subjected to solid-liquid separation, and washed by passing water to remove the excessive oxidizing agent, and thus a water-containing nickel powder cake was obtained. Then, the nickel crystal powder (nickel powder) was subjected to spiral jet disintegrating treatment in the same manner as in Example 1. Through the above-described steps, the nickel powder according to Comparative Example 3 produced by the wet process was obtained.

(Physical Properties of Nickel Powder)

The obtained nickel powder had an average particle size of 0.20 μm, and had an oxygen content of 0.37 mass %·g/m$^2$ and a sulfur content of 0.051 mass %·g/m$^2$ with respect to the specific surface area (m$^2$/g) of the nickel powder. The content of the coarse particles having a particle size of more than 0.8 μm and containing plate-shaped nickel hydroxide as a main component was 260 mass ppm, and the content of the coarse particles having a particle size of more than 1.2 μm and containing plate-shaped nickel hydroxide as a main component was 130 mass ppm. The resin decomposition peak temperature (Tn) of the nickel powder was measured and found to be 340° C. Therefore, (Tr−Tn) was 0° C.

Comparative Example 4

A nickel crystal powder (nickel powder) was obtained in the same manner as in Comparative Example 3 except that surface treatment (sulfur coating treatment) was not performed on the nickel crystal powder in the diluted nickel powder slurry obtained by removing (decanting) the supernatant of the nickel powder slurry obtained in the crystallization step and adding pure water. Then, the nickel crystal powder (nickel powder) was subjected to spiral jet disintegrating treatment in the same manner as in Example 1. Through the above-described steps, the nickel powder according to Comparative Example 4 produced by the wet process was obtained.

(Physical Properties of Nickel Powder)

The obtained nickel powder had an average particle size of 0.20 μm, and had an oxygen content of 0.37 mass %·g/m$^2$ and a sulfur content of 0.021 mass %·g/m$^2$ with respect to the specific surface area (m$^2$/g) of the nickel powder. The content of the coarse particles having a particle size of more than 0.8 μm and containing plate-shaped nickel hydroxide as a main component was 230 mass ppm, and the content of the coarse particles having a particle size of more than 1.2 μm and containing plate-shaped nickel hydroxide as a main component was 110 mass ppm. The resin decomposition peak temperature (Tn) of the nickel powder was measured and found to be 335° C. Therefore, (Tr−Tn) was 5° C.

Comparative Example 5

A nickel crystal powder (nickel powder) was obtained in the same manner as in Example 11 except that oxide film forming treatment was not performed on the nickel crystal powder. Then, the nickel crystal powder (nickel powder) was subjected to spiral jet disintegrating treatment in the same manner as in Example 1. Through the above-described steps, the nickel powder according to Comparative Example 5 produced by the wet process was obtained.

(Physical Properties of Nickel Powder)

The obtained nickel powder had an average particle size of 0.30 μm, and had an oxygen content of 0.30 mass %·g/m$^2$ and a sulfur content of 0.023 mass %·g/m$^2$ with respect to the specific surface area (m$^2$/g) of the nickel powder. The content of the coarse particles having a particle size of more than 0.8 μm and containing plate-shaped nickel hydroxide as a main component was 370 mass ppm, and the content of the coarse particles having a particle size of more than 1.2 μm and containing plate-shaped nickel hydroxide as a main component was 180 mass ppm. The resin decomposition peak temperature (Tn) of the nickel powder was measured and found to be 305° C. Therefore, (Tr−Tn) was 35° C.

TABLE 1

| | | Oxide film forming treatment | | Particle characteristics | | Constituent element other than nickel in nickel powder | | | |
|---|---|---|---|---|---|---|---|---|---|
| | Sulfur coating treatment | Oxidizing agent | Major anion other than OH$^-$ | Average particle size (μm) | Specific surface area (m$^2$/g) | O (mass %) | C (mass %) | S (mass %) | Cl (mass %) |
| Example 1 | Present | Hydrogen peroxide ($H_2O_2$) | Sulfate ion ($SO_4^{2-}$) Chlorine ion ($Cl^-$) | 0.20 | 4.3 | 1.8 | 0.04 | 0.26 | 0.004 |
| Example 2 | Absent | Hydrogen peroxide ($H_2O_2$) | Sulfate ion ($SO_4^{2-}$) Chlorine ion ($Cl^-$) | 0.20 | 4.3 | 1.8 | 0.04 | 0.12 | 0.002 |
| Example 3 | Present | Hydrogen peroxide ($H_2O_2$) | Chlorine ion ($Cl^-$) | 0.20 | 4.3 | 1.8 | 0.04 | 0.22 | 0.004 |
| Example 4 | Absent | Hydrogen peroxide ($H_2O_2$) | Chlorine ion (Cl—) | 0.20 | 4.3 | 1.7 | 0.04 | 0.09 | 0.003 |
| Example 5 | Present | Hydrogen peroxide ($H_2O_2$) | Nitrate ion ($NO_3^-$) | 0.20 | 4.3 | 1.8 | 0.05 | 0.21 | <0.001 |

TABLE 1-continued

| | | | | | | | | | |
|---|---|---|---|---|---|---|---|---|---|
| Example 6 | Absent | Hydrogen peroxide ($H_2O_2$) | Nitrate ion ($NO_3^-$) | 0.20 | 4.3 | 1.7 | 0.05 | 0.09 | <0.001 |
| Example 7 | Present | Hydrogen peroxide ($H_2O_2$) | Carbonate ion ($CO_3^{2-}$) | 0.20 | 4.3 | 1.8 | 0.10 | 0.22 | <0.001 |
| Example 8 | Absent | Hydrogen peroxide ($H_2O_2$) | Carbonate ion ($CO_3^{2-}$) | 0.20 | 4.3 | 1.7 | 0.10 | 0.09 | <0.001 |
| Example 9 | Present | Hydrogen peroxide ($H_2O_2$) | Formic acid ion ($HCOO^-$) | 0.20 | 4.3 | 1.6 | 0.08 | 0.21 | <0.001 |
| Example 10 | Present | Hydrogen peroxide ($H_2O_2$) | Acetate ion ($CH_3COO^-$) | 0.20 | 4.3 | 1.7 | 0.08 | 0.22 | <0.001 |
| Example 11 | Absent | Hydrogen peroxide ($H_2O_2$) | Chlorine ion ($Cl^-$) | 0.30 | 3.1 | 1.5 | 0.03 | 0.07 | 0.003 |

| | Constituent element other than nickel in nickel powder | | Basic salt of oxide film/Ni(OH)$_2$ | Evaluation of suppressing formation of coarse particles containing plate-shaped Ni(OH)$_2$ as main component (40° C. × 1 hr in the air) | Content of coarse particles containing plate-shaped Ni(OH)$_2$ as main component | | Evaluation of suppressing binder resin decomposition |
|---|---|---|---|---|---|---|---|
| | N (mass %) | Na (mass %) | | | Particle size: more than 0.8 µm (mass ppm) | Particle size: more than 1.2 µm (mass ppm) | |
| Example 1 | 0.008 | 0.0006 | Ni(OH)$_x$(SO$_4$)$_Y$Cl$_Z$ | ○ | 30 | <10 | ○ |
| Example 2 | 0.008 | 0.0005 | Ni(OH)$_x$(SO$_4$)$_Y$Cl$_Z$ | ○ | 20 | <10 | ○ |
| Example 3 | 0.007 | 0.0007 | Ni(OH)$_x$Cl$_Y$ | ○ | 40 | <10 | ○ |
| Example 4 | 0.009 | 0.0006 | Ni(OH)$_x$Cl$_Y$ | ○ | 30 | <10 | ○ |
| Example 5 | 0.014 | 0.0006 | Ni(OH)$_x$(NO$_3$)$_Y$ | ○ | 50 | <10 | ○ |
| Example 6 | 0.012 | 0.0005 | Ni(OH)$_x$(NO$_3$)$_Y$ | ○ | 40 | <10 | ○ |
| Example 7 | 0.008 | 0.0006 | Ni(OH)$_x$(CO$_3$)$_Y$ | ○ | 40 | <10 | ○ |
| Example 8 | 0.008 | 0.0006 | Ni(OH)$_x$(CO$_3$)$_Y$ | ○ | 30 | <10 | ○ |
| Example 9 | 0.007 | 0.0006 | Ni(OH)$_x$(HCOO)$_Y$ | ○ | 40 | <10 | ○ |
| Example 10 | 0.007 | 0.0006 | Ni(OH)$_x$(CH$_3$COO)$_Y$ | ○ | 40 | <10 | ○ |
| Example 11 | 0.005 | 0.0005 | Ni(OH)$_x$Cl$_Y$ | ○ | 60 | <10 | ○ |

TABLE 2

| | Oxide film forming treatment | | Particle characteristics | | Constituent element other than nickel in nickel powder | | | |
|---|---|---|---|---|---|---|---|---|
| | Sulfur coating treatment | Oxidizing agent | Major anion other than OH$^-$ | Average particle size (µm) | Specific surface area (m$^2$/g) | O (mass %) | C (mass %) | S (mass %) | Cl (mass %) |
| Comparative Example 1 | Present | Absent | — | 0.20 | 4.2 | 1.1 | 0.04 | 0.22 | <0.001 |
| Comparative Example 2 | Absent | Absent | — | 0.20 | 4.2 | 1.1 | 0.04 | 0.09 | <0.001 |
| Comparative Example 3 | Present | Hydrogen peroxide ($H_2O_2$) | — | 0.20 | 4.3 | 1.6 | 0.04 | 0.22 | <0.001 |
| Comparative Example 4 | Absent | Hydrogen peroxide ($H_2O_2$) | — | 0.20 | 4.3 | 1.6 | 0.04 | 0.09 | <0.001 |
| Comparative Example 5 | Absent | Absent | — | 0.30 | 3.0 | 0.9 | 0.03 | 0.07 | <0.001 |

TABLE 2-continued

| | Constituent element other than nickel in nickel powder | | Basic salt of | Evaluation of suppressing formation of coarse particles containing plate-shaped Ni(OH)$_2$ as main component | Content of coarse particles containing plate-shaped Ni(OH)$_2$ as main component | | Evaluation of suppressing |
|---|---|---|---|---|---|---|---|
| | N (mass %) | Na (mass %) | oxide film/Ni(OH)$_2$ | as main component (40° C. × 1 hr in the air) | Particle size: more than 0.8 μm (mass ppm) | Particle size: more than 1.2 μm (mass ppm) | binder resin decomposition |
| Comparative Example 1 | 0.009 | 0.0004 | Ni(OH)$_2$ | x | 310 | 150 | ○ |
| Comparative Example 2 | 0.008 | 0.0004 | Ni(OH)$_2$ | x | 250 | 120 | x |
| Comparative Example 3 | 0.009 | 0.0005 | Ni(OH)$_2$ | x | 260 | 130 | ○ |
| Comparative Example 4 | 0.008 | 0.0005 | Ni(OH)$_2$ | x | 230 | 110 | ○ |
| Comparative Example 5 | 0.005 | 0.0003 | Ni(OH)$_x$Cl$_y$ | x | 370 | 180 | x |

CONCLUSION

As the result of comparing Examples and Comparative Examples according to the present invention, it is clear that in Examples 1 to 11 in which an oxide film containing a nickel hydroxide basic salt as a main component was formed on the surface through the oxide film forming step, particularly in Examples 2, 4, 6, 8, and 11 in which sulfur coating treatment was not performed, the content of the coarse particles having a size of more than 0.8 μm or a size of more than 1.2 μm and containing plate-shaped nickel hydroxide as a main component is much smaller than in Comparative Examples 1, 2, and 5 in which no oxide film was formed without oxide film forming step and Comparative Examples 3 and 4 in which an oxide film containing nickel hydroxide as a main component was formed on the surface through the oxide film forming step, and that in Examples 1 to 11, particularly in Examples 2, 4, 6, 8, and 11, it is possible to provide a nickel powder that can achieve high flatness in the nickel paste dry film and a method for manufacturing the nickel powder.

Furthermore, it can be seen that in Examples 2, 4, 6, 8, and 11 according to the present invention, an oxide film containing a nickel hydroxide basic salt as a main component was formed on the surface through the oxide film forming step without sulfur coating treatment, resulting in effective suppression of decomposition of the binder resin in spite of the low sulfur content.

In particular, the present invention can provide a method for manufacturing nickel particles by a wet process, and in the method, a nickel powder having a very small content of coarse particles containing plate-shaped nickel hydroxide as a main component can be produced further simply and easily.

REFERENCE SIGNS LIST

1 Nickel particle (nickel crystal powder)
2 Plate-shaped nickel hydroxide generated by oxidation of nickel crystal powder and growth into a crystal of oxidized nickel crystal powder
10 Coarse particle containing plate-shaped nickel hydroxide as a main component

The invention claimed is:

1. A nickel powder comprising substantially spherical particles having a number average size of 0.03 μm to 0.4 μm, wherein the nickel powder has an oxide film and plate-shaped particles of nickel-hydroxide on a surface, wherein
    a main component of the oxide film is a basic salt of nickel hydroxide,
    wherein
    a content of the plate-shaped nickel hydroxide particles having a particle size of more than 0.8 μm is 200 mass ppm or less, and
    a content of the plate-shaped nickel hydroxide particles having a particle size of more than 1.2 μm is 100 mass ppm or less.

2. The nickel powder according to claim 1, wherein the basic salt of nickel hydroxide includes one or more selected from the group consisting of a sulfate ion ($SO_4^{2-}$), a chloride ion ($Cl^-$), a nitrate ion ($NO_3^-$), acarbonate ion ($CO_3^{2-}$), a formic acid ion ($HCOO^-$), and an acetate ion ($CH_3COO^-$).

3. The nickel powder according to claim 1, wherein the nickel powder has an oxygen content of 0.35 mass % g/m$^2$ or more with respect to a specific surface area of the nickel powder, and the nickel powder has a sulfur content of 0.04 mass % g/m$^2$ or less with respect to the specific surface area of the nickel powder.

4. A method for manufacturing the nickel powder according to claim 1, the method comprising:
    an oxide film forming step of mixing a mixture of a nickel powder slurry in which a nickel powder without an oxide film is dispersed and one or more selected from the group consisting of a sulfate ion ($SO_4^{2-}$), a chloride ion ($Cl^-$), a nitrate ion ($NO_3^-$), a carbonate ion ($CO_3^{2-}$), a formic acid ion ($HCOO^-$), and an acetate ion ($CH_3COO^-$) and hydrogen peroxide ($H_2O_2$) to form the oxide film on the surface of the nickel powder, the oxide film containing, as a main component, a basic salt of nickel hydroxide containing one or more selected from at least a sulfate ion ($SO_4^{2-}$), a chloride ion ($Cl^-$), a nitrate ion ($NO_3^-$), carbonate ion ($CO_3^{2-}$), a formic acid ion ($HCOO^-$), and an acetate ion ($CH_3COO^-$);
    a washing and filtering step of washing and filtering out the nickel powder including the oxide film formed on the surface to obtain a water-containing nickel powder cake of the nickel powder; and a drying step of heating and drying the water-containing nickel powder cake to obtain the nickel powder.

5. The method for manufacturing the nickel powder according to claim 4, the method further comprising:
a crystallization step comprising forming a nickel powder slurry in which the nickel powder without an oxide film is dispersed by crystallization using a reductive reaction in a reaction liquid containing, at least, a water-soluble nickel salt, a salt of a metal nobler than nickel, a reducing agent, and an alkali hydroxide.

6. The method for manufacturing the nickel powder according to claim 5, wherein the water-soluble nickel salt is one or more selected from the group consisting of nickel chloride ($NiCl_2$), nickel sulfate ($NiSO_4$), and nickel nitrate ($Ni(NO_3)_2$).

7. The method for manufacturing the nickel powder according to claim 5, wherein the salt of a metal nobler than nickel is one or more selected from the group consisting of a copper salt, a gold salt, a silver salt, a platinum salt, a palladium salt, a rhodium salt, and an iridium salt.

8. The method for manufacturing the nickel powder according to claim 5, wherein the alkali hydroxide is one or more selected from the group consisting of sodium hydroxide (NaOH) and potassium hydroxide (KOH).

9. The method for manufacturing the nickel powder according to claim 5, the method further comprising a sulfur coating treatment step of subjecting the nickel powder slurry obtained in the crystallization step to sulfur coating treatment as surface treatment in which sulfur is adhered to a surface of the nickel powder without an oxide film, wherein
the sulfur coating treatment step is performed between the crystallization step and the oxide film forming step.

* * * * *